United States Patent [19]

Matsushima

[11] Patent Number: 5,587,558
[45] Date of Patent: Dec. 24, 1996

[54] COORDINATE DETECTING APPARATUS HAVING ACCELERATION DETECTORS

[75] Inventor: Kenichi Matsushima, Tokyo, Japan

[73] Assignee: Seiko Instruments Inc., Japan

[21] Appl. No.: 7,072

[22] Filed: Jan. 21, 1993

[30] Foreign Application Priority Data

| Jan. 24, 1992 | [JP] | Japan | 4-010627 |
| May 26, 1992 | [JP] | Japan | 4-133921 |
| Aug. 26, 1992 | [JP] | Japan | 4-227643 |

[51] Int. Cl.⁶ .............................. G08C 21/00; G09G 3/02
[52] U.S. Cl. ................... 178/18; 178/19; 178/20; 345/156; 345/157; 345/173; 345/174; 345/175; 345/179; 345/180
[58] Field of Search ................... 178/18, 19, 20; 345/156, 157, 173, 174, 175, 179, 180

[56] References Cited

U.S. PATENT DOCUMENTS

| 4,477,877 | 10/1984 | Nakamura et al. | 178/19 |
| 4,740,660 | 4/1988 | Kimura | 178/19 |
| 4,752,655 | 6/1988 | Tajiri et al. | 178/20 |
| 4,818,826 | 4/1989 | Kimura | 178/19 |
| 4,959,805 | 9/1990 | Ohouchi et al. | 178/18 |
| 5,134,689 | 7/1992 | Murakami et al. | 178/19 |
| 5,159,321 | 10/1992 | Masaki et al. | 178/18 |
| 5,239,489 | 8/1993 | Russell | 178/18 |
| 5,247,137 | 9/1993 | Epperson | 178/18 |
| 5,248,855 | 9/1993 | Cambridge | 178/20 |

Primary Examiner—Wellington Chin
Assistant Examiner—Vijay Shankar
Attorney, Agent, or Firm—Adams & Wilks

[57] ABSTRACT

A coordinate input device includes a coordinate detector which may include an acceleration detector for accurate determination of the spatial coordinates of a coordinate indicator. A three-dimensional acceleration in a first coordinate system is detected by a first acceleration detecting unit and is converted into an input coordinate system in accordance with the attitude of the coordinate indicator. The effect of gravity is removed and the acceleration is integrated to obtain the spatial coordinates of the coordinate indicator. Even if the coordinate indicator is tilted, accurate coordinate input can be performed.

28 Claims, 18 Drawing Sheets

COORDINATE OUTPUT

CONTACT SIGNAL

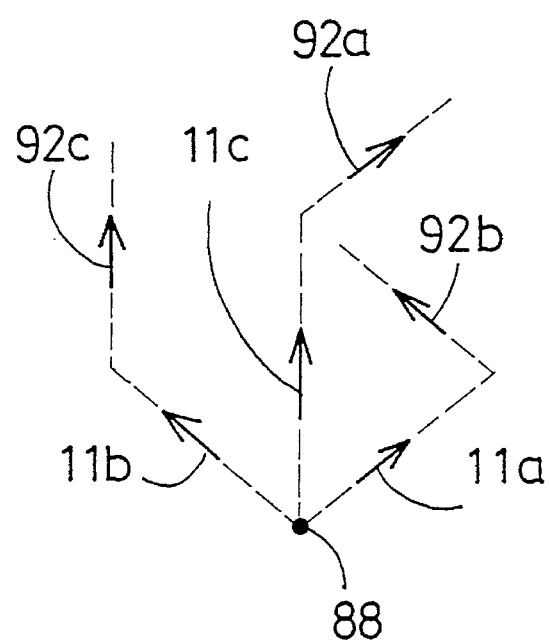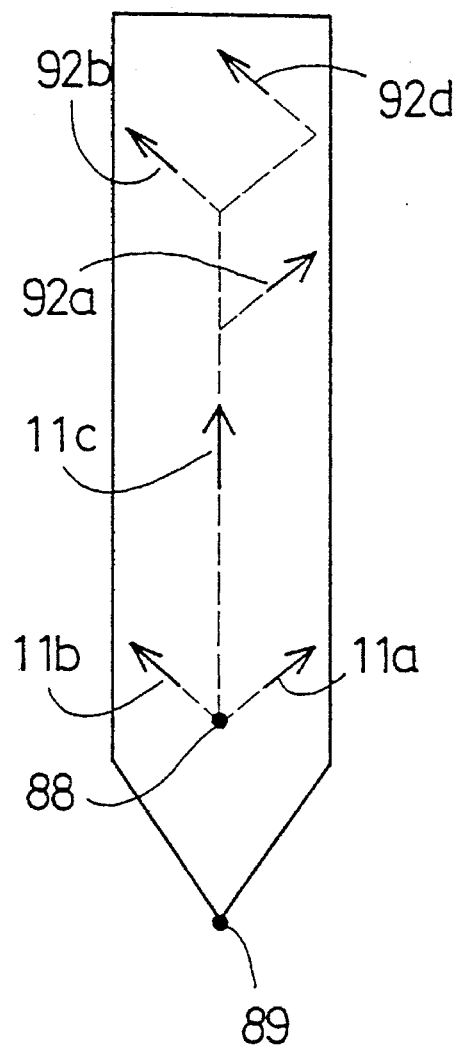

ACCELERATION → POSITION

ACCELERATION → POSITION

COORDINATE DETECTING APPARATUS HAVING ACCELERATION DETECTORS

BACKGROUND OF THE INVENTION

1. Field of the Invention

The present invention relates generally to a coordinate input device and in particular, to coordinate input device for manual character input and two- or three-dimensional coordinate input for a computer.

2. Description of the Related Art

As shown in FIG. 2, a conventional coordinate input device is formed of an acceleration detector 1, a first integrator 3, and a second integrator 5. In order to obtain the spatial coordinates at the tip of a coordinate indicator, the acceleration detector 1 detects two-dimensional accelerations of the tip of the coordinate indicator using an acceleration detector fixed at the tip of a pen-type coordinate indicator to detect two-directional accelerations in perpendicular planes. The first integrator 3 integrates the acceleration of the tip of the coordinate indicator output by the acceleration detector 1 to obtain the velocity at the tip thereof. The second integrator 5 integrates the velocity of the tip of the coordinate indicator output by the first integrator 3 to obtain the spatial coordinates at the tip of the coordinate indicator. Such a coordinate input device is disclosed, for example, in Japanese patent Application Laid-open No. 156519-1991.

However, there has been a disadvantage in that the above conventional coordinate input device can input only two-dimensional coordinates and cannot input three dimensional coordinates. Furthermore, when a pen acting as a coordinate indicator is tilted or changed in its attitude or rotational orientation, the effect of gravity causes an erroneous determination of the acceleration of the pen, thus making it difficult to perform accurate coordinate input. Further, when a pen is tilted but the position of the tip is not changed, the device erroneously detects such movement as a change in the position of the tip, resulting in further inaccuracy of conventional coordinate input devices.

Furthermore, there has been a disadvantage in that the conventional coordinate input device, as shown in FIG. 21, requires periodical initializing because the error in the position which is obtained by twice integrating detected acceleration values diverges significantly even when a small noise signal is erroneously detected as acceleration of a pen.

SUMMARY OF THE INVENTION

An object of the present invention is to provide a coordinate input device which can perform three-dimensional coordinate input as well as accurate coordinate input even when a coordinate indicator tilts.

Another object of the present invention is to provide a coordinate input device which can input the tip coordinates of a pen even if an acceleration detector is not arranged at the tip thereof.

Still another object of the present invention is to provide a coordinate input device which can accurately input coordinates without gradually accumulating an arithmetic error component or the like to the directional information when the attitude or rotational orientation of a pen is calculated.

Still another object of the present invention is to provide a coordinate input device which does not diverge from a detected coordinate value even when noise is erroneously detected as acceleration of a coordinate indicator.

In order to achieve the above objects, the coordinate input device according to the present invention comprises an acceleration detecting means for detecting accelerations in three independent dimensions, of a pen being a coordinate indicator, an incline direction detecting means for detecting the attitude or rotation of the pen, and a coordinate operation means for receiving the output of the acceleration detecting means as well as the output of the direction detecting means and for determining the spatial coordinates at the tip of the pen.

In a first preferred embodiment the coordinate input device according to the present invention comprises an acceleration detecting means for detecting the acceleration of a pen, and the coordinate operation means comprises a first integrating means for integrating the output of the acceleration detecting means, and a second integrating means for integrating the output of the first integrating means to feed back to the first integrating means.

In the above coordinate input device, the acceleration detecting means detects the acceleration of a pen for input to the coordinate operation means. The coordinate operation means further includes gravity compensating means to eliminate the effect of gravity from the detected pen acceleration detected by the acceleration detecting means and the first integration means integrates the acceleration in which the effect of gravity is removed to produce velocity information. The second integration means integrates the velocity information to produce the spatial information at the pen based acceleration detecting point. The coordinate operation means also includes second coordinate converting means to convert the spatial information output by the second integration means into the spatial coordinates of the pen tip.

The coordinate input device of the present invention further includes direction detecting means to detect the angle of incline (referred to as attitude) of a pen. In accordance with the detected directional information, the pen acceleration output by the acceleration detecting means or the pen velocity output by the first integration means is converted from a first spatial value in a pen based coordinate system into a second spatial value in an input coordinate system by the first coordinate conversion means within the coordinate operation means, whereby acceleration or velocity based on the input coordinate system can be accurately obtained. In such a manner, the gravity compensation means can remove completely the effect of gravity which varies in each coordinate axis with the rotation of a pen. Furthermore, even when being determined by the second coordinate conversion means within the coordinate operation means, the coordinates of a pen can be accurately calculated by using the direction information output by the incline direction detecting means. In the coordinate input device of the present invention, even when a pen is tilted, an accurate coordinate can be obtained by removing the effect of gravity by performing compensation or conversion in accordance with the incline direction of a pen.

The coordinate input device described above detects the three-dimensional acceleration of a pen using an acceleration detecting means integrating the detected acceleration detected by the acceleration detecting means using a first integration means to convert into velocity information, and further by integrating the velocity information using the second integration means to provide position information. Since the output of the second integration means is fed back to the first integration means, the position information provided by the second integration means does not significantly diverge even when a noise signal is erroneously detected as acceleration by the acceleration detecting means.

As described above, the coordinate input device according to the present invention can prevent a detected value from diverging due to the use of a feedback loop arranged in the integration operation even when a noise signal is present on the detected value of the acceleration of a pen.

BRIEF DESCRIPTION OF THE DRAWINGS

FIG. 11 is a layout diagram showing acceleration detectors for first and second acceleration detecting units in the coordinate input device according to the present invention.

FIG. 12 is a layout diagram showing another embodiment of acceleration detectors for first and second acceleration detecting units in the coordinate input device according to the present invention.

DESCRIPTION OF THE PREFERRED EMBODIMENTS

The preferred embodiments of the present invention will be explained below in accordance with the attached drawings.

Figure 1:
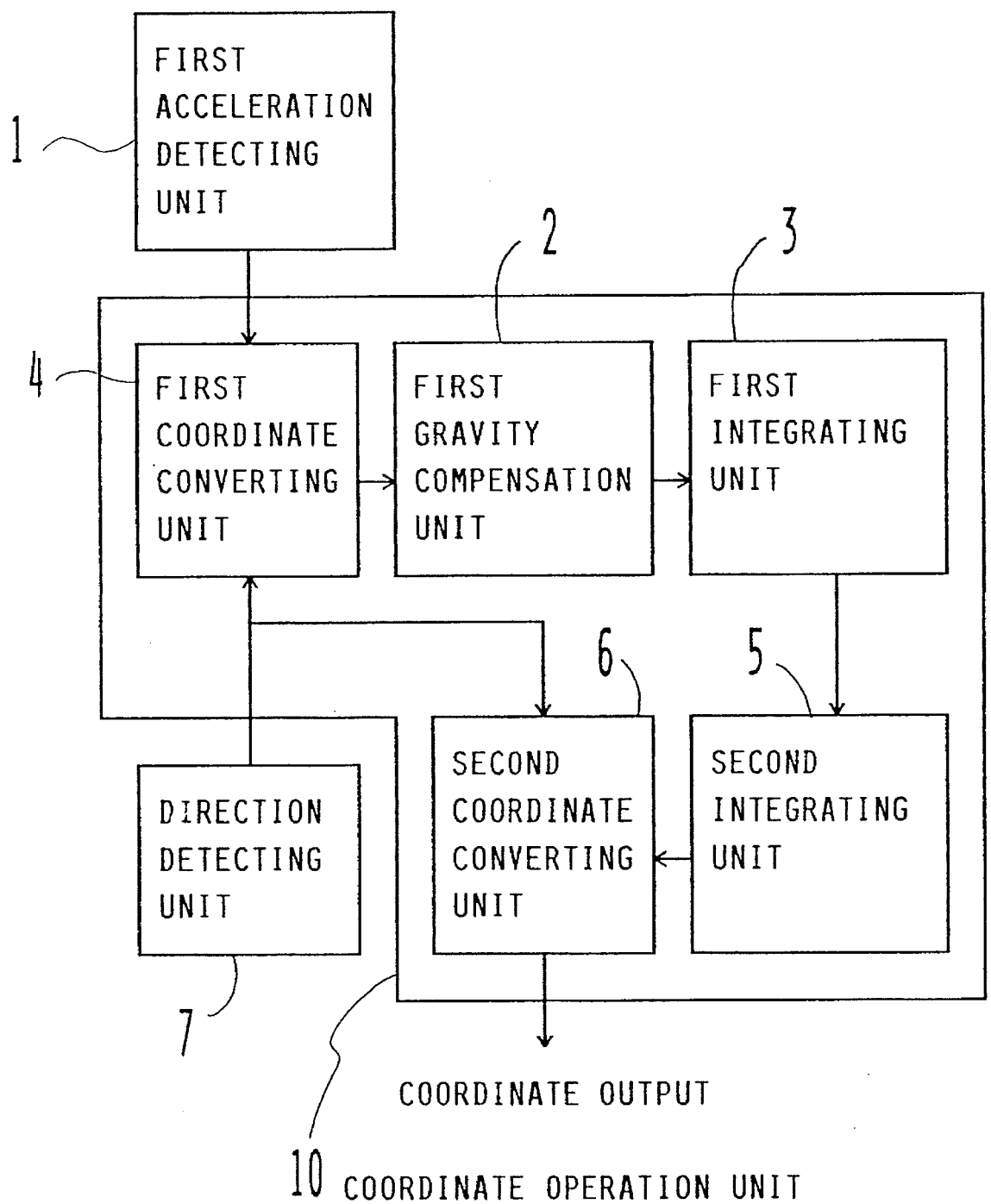
FIG. 1 is a system block diagram of a coordinate input device according to the present invention.
Figure 2:
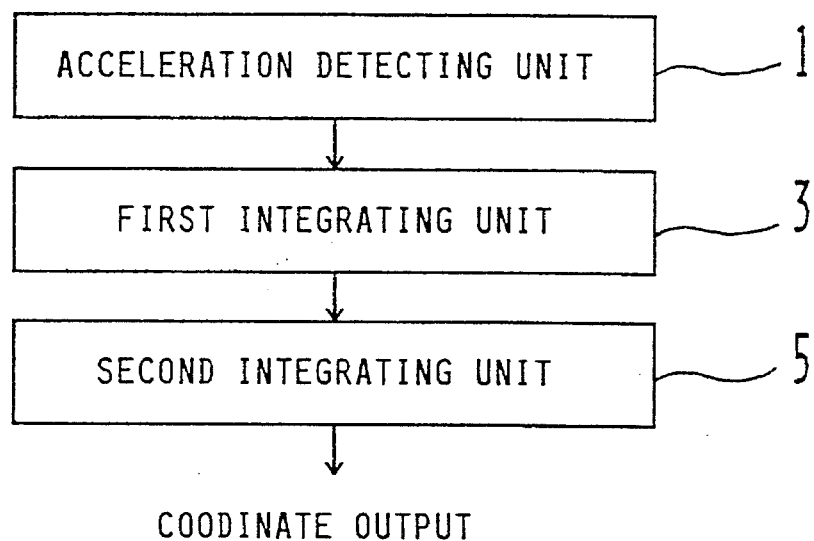
FIG. 2 is a block diagram showing a construction of a conventional coordinate input device.

Referring to FIG. 1, in the coordinate input device according to the present invention, a first acceleration detecting unit 1 detects the three dimensional acceleration components of the reference point of a pen acting as a coordinate indicator to output the acceleration information to the coordinate operation unit 10. The first coordinate conversion unit 4 within the coordinate operation unit 10 converts the pen acceleration components supplied by the first acceleration detecting unit 1 into a value in an input coordinate system from a value in a pen based coordinate system. The first gravity compensation unit 2 removes the effect of gravity from the converted acceleration. The first integration unit 3 integrates the acceleration in which the effect of gravity has been removed to provide velocity information. A second integration unit 5 integrates the velocity information to convert said velocity into positional information regarding the reference point within a pen. Finally the second coordinate converting unit 6 converts the position information from the second integration unit 5 obtained at the reference point within the pen into the coordinate of the pen tip.

The direction detecting unit 7 detects three dimensional directions of a pen. In other words, the direction detecting unit determines the attitude of the pen in three dimensions. Using the directional information output by the direction detecting unit 7, the first coordinate transformation unit 4 converts the acceleration at the reference point of a pen from the first acceleration detecting unit 1 from a value in a pen based coordinate system to a value in an input coordinate system. The effect of gravity which varies in accordance with the direction of a pen in the pen based coordinate system therefore becomes constant in the input coordinate system. Hence the first gravity compensation unit 2 can accurately subtract the effect of gravity in the input coordinate system from the acceleration value of a pen. Furthermore when the pen tip coordinate is calculated in the second coordinate transformation unit 6, it is possible to obtain accurately the coordinate of the pen tip by operating using the directional information inputted from the directional detecting unit 7.

Next a detailed explanation about various elements will be made below.

(1) Coordinate System

First, let us explain coordinate systems. This invention uses two coordinate systems: one being a pen coordinate system which is a three dimensional rectangular coordinate system having virtual space directions fixed to a pen and the other being a static coordinate system which is a three dimensional rectangular coordinate system having space directions to input the coordinate of the tip of a pen. The static coordinate system is not required to be still necessarily, but shows only coordinate values to be inputted.

(2) First Acceleration Detecting Unit

The first acceleration detecting unit 1, as shown in FIG. 11, is composed of acceleration detecting units 11a to 11c which are arranged so as to overlap their detecting directions along the three coordinate axes of the pen coordinate system. Such a structure detects three dimensional acceleration apX, apY, apZ, with the origin 88 in the pen coordinate system being the reference point within the pen to output them to the first coordinate converting unit 4. However the first acceleration detecting unit 1 should not be limited to the example but any kind of units may be used which can detect three dimensional accelerations at the origin 88 in the pen coordinate system. An acceleration detector with a well-known Piezo electric ceramic has been used as the acceleration detecting unit 11. However, any type of acceleration detectors including semiconductor piezoelectric resistance type acceleration detectors or the like may be used.

(3) Direction Detecting Unit

Figure 3:
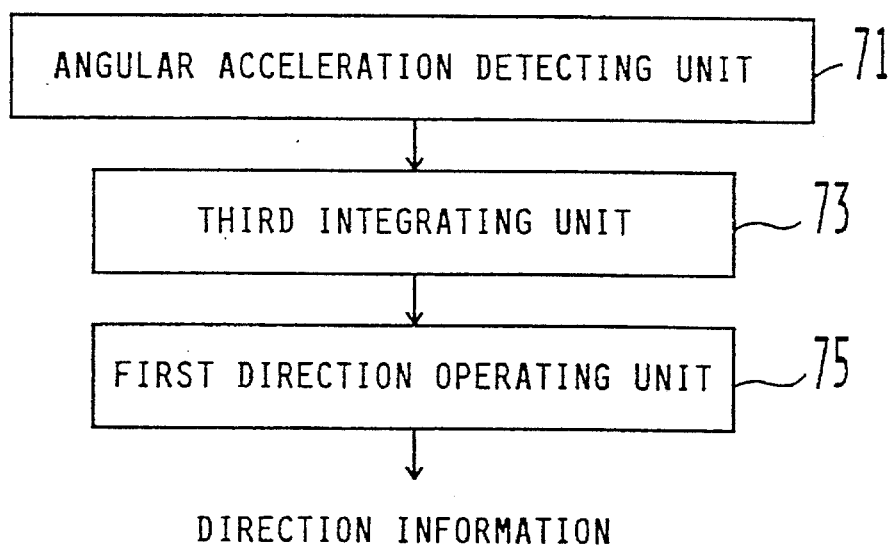
FIG. 3 is a block diagram of a direction detecting unit in the coordinate input device according to the present invention.

The direction detecting unit 7, as shown in FIG. 3, comprises an angular acceleration detecting unit 71, a third integration unit 73, and a first direction operation unit 75 and outputs information indicating the angular direction, or attitude of a pen.

The angular acceleration detecting unit 71 is formed of three well-known angular acceleration detectors. Each of the angular acceleration detectors is arranged in such a manner that the axis direction to detect rotation are in parallel with the three respective axes in the pen coordinate system, and angular acceleration components LX, LY, LZ are outputted. However the angular acceleration detecting unit 71 should not be limited to the present example, but any kinds of units may be used which detect three dimensional angular accelerations.

Usually the value detected by the linear acceleration detector fixed on a pen contains a linear acceleration component and an angular acceleration component thereof. Since a group of acceleration detectors with parallel detecting directions detect the same values in case of no angular acceleration, the angular acceleration component is proportional to the difference between the values detected by two acceleration detectors having parallel detecting directions. Hence the angular acceleration detecting unit 71 can be constructed using a well-known gyroscope with a rotator and a vibrator. Rather than using conventional angular acceleration detectors, however, it is possible to detect an angular acceleration using the difference between values detected by two acceleration detectors each which has a detecting direction parallel to each other. In this structure, a pair of acceleration detectors with parallel detection directions can detect the component of the angular acceleration which has as an angular acceleration rotating axis the direction perpendicular to the plane specified by the two parallel detection directions. Three dimensional angular acceleration can be detected by arranging three groups of acceleration detectors in the manner that the normal direction to the plane specified by the detecting directions of the pair of acceleration detectors are parallel to the three coordinate axes in the pen coordinate system.

Figure 7:
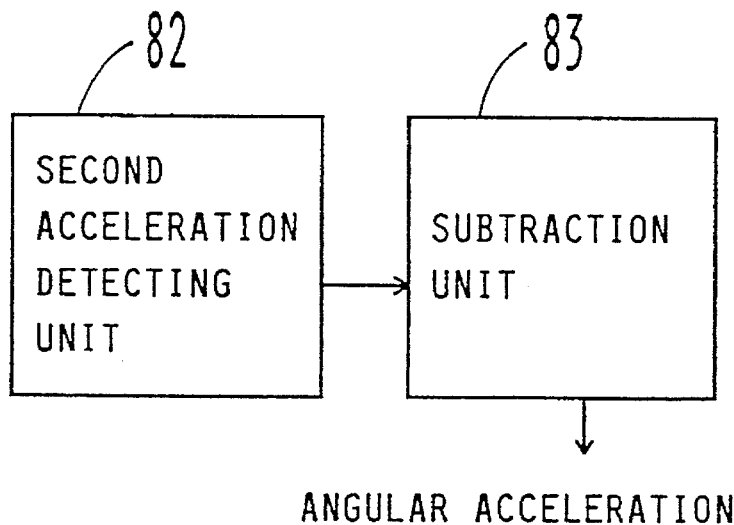
FIG. 7 is a block diagram showing an embodiment of an angular acceleration detecting unit of the coordinate input device according to the present invention.

The above examples are shown in FIGS. 7 and 11. The second acceleration detecting unit 82 is constructed by arranging six acceleration detectors 11a to 11c and 92a to 92c in the manner that the detecting directions are in parallel in the three planes with normals of three different axes. The subtraction unit 83 operates to determine the difference between the outputs of each respective pair of acceleration detectors 11a and 92a, 11b and 92b and 11c and 92c with parallel detecting directions in each of the three directions, to obtain three dimensional angular acceleration components LX, LY, and LZ.

As described above, the angular acceleration can be detected by combining linear acceleration detectors which have detection directions parallel to each other. Likewise, angular acceleration also can be calculated by using three acceleration detectors in which the detection direction is not parallel in the same plane.

As described above, an angular acceleration detector can be used as the angular acceleration detection unit 71 and also can be constructed by combining linear acceleration detectors. In order to detect angular accelerations corresponding to three different directions in space, it is possible to use an angular acceleration detector for a certain direction component together with pairs of combined linear acceleration detectors for the components of the other directions.

The acceleration detector 92 in the second acceleration detecting unit 82 and the acceleration detector 11 in the first acceleration detecting unit 1 can be of different types. However as shown in FIG. 11, one acceleration detector can be shared in common, thus resulting in a reduced number of acceleration detectors.

Furthermore, as shown in FIG. 12, acceleration detectors may be arranged in various combinations. For example, the first acceleration detecting unit 1 and the second acceleration detecting unit 82 perform acceleration detection by arranging acceleration detectors by keying adapted with a pen shape. If acceleration or angular acceleration in different directions can be detected, however, any type of accelerating detectors can be used as the acceleration detectors 11 and 92.

The third integration unit 73 of FIG. 3 integrates the three-dimensional angular acceleration components LX, LY, LZ outputted from the angular acceleration detector 71 and outputs three-dimensional angular velocity components WX, WY, WZ to the first directional operation unit 75. The third integration unit 73 may be realized by analog integration circuitry using a well-known operational amplifier or the like. The calculation of the recurrence formula shown by the equation (1) may be realized using digital circuits, software or the like.

$$WX(t) = WX(t-\Delta t) + \Delta t \cdot LX(t)$$

$$WY(t) = WY(t-\Delta t) + \Delta t \cdot LY(t) \quad \text{Equation (1)}$$

$$WZ(t) = WZ(t-\Delta t) + \Delta t \cdot LZ(t)$$

where Δt shows an calculation period of the recurrence formula.

The first detection operation unit 75 determines the incline and direction of a pen using three dimensional angular velocity information WX, WY, WZ output by the third integration unit 73. In this case, the pen direction is shown by 3×3 matrix coefficient Aij of the coordinate conversion of three dimensional rotation defined by equation (2). PX, PY, PZ are values in the coordinate system seen from a pen, and SX, SY, SZ are values in static coordinate system becoming a reference for coordinate input. However it is assumed that the origins of the pen coordinate system and the static coordinate system coincide with each other for calculation since the directional information of a pen is independent to the position of the pen. The pen information may be available through various methods. For example, it can be expressed using both two directional components of a polar coordinate indicating a longitudinal direction of a pen and an angular direction made by the longitudinal direction of a pen as an axis. The pen information may be expressed in any format which represents the direction of a pen by two directional components and by an angle of a rotational direction made by the longitudinal direction of a pen and which indicates three dimensional coordinates of a pen which is such as the vector of a static coordinate system indicating the longitudinal direction of a pen and the angle of a rotational direction made by the longitudinal direction of a pen as an axis. In this case, if necessary, a known method can convert to Aij through operation.

$$\begin{pmatrix} SX \\ SY \\ SZ \end{pmatrix} = \begin{pmatrix} A11 & A12 & A13 \\ A21 & A22 & A23 \\ A31 & A32 & A33 \end{pmatrix} \begin{pmatrix} PX \\ PY \\ PZ \end{pmatrix} \quad \text{Equation (2)}$$

The renewal of the directional information in the first directional operation unit 75 may be realized using analog circuits or the like. The renewal also may be performed by realizing the recurrence formula shown in equation 3 by digital circuits or software.

$$Aij(t) = Aij(t-\Delta t) \cdot Wij(t)$$
$$W11(t) = W22(t) = W33(t) = 1$$
$$W23(t) = -W32(t) = \Delta t \cdot WX(t) \quad \text{Equation (3)}$$
$$W31(t) = -W13(t) = \Delta t \cdot WY(t)$$
$$W12(t) = -W21(t) = \Delta t \cdot WZ(t)$$

where Δt represent an operational period of the recurrence formula. i=1, 2, and 3. j=1, 2, and 3.

Figure 8:
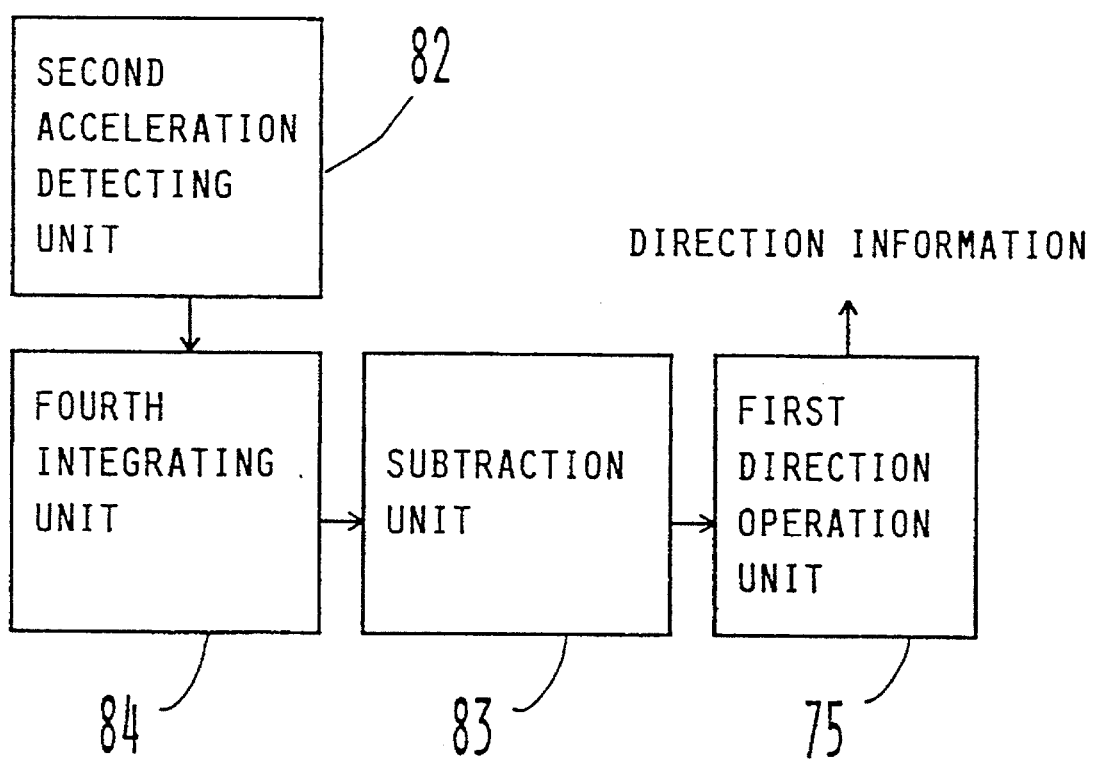
FIG. 8 is a block diagram of another embodiment of a direction detecting unit of the coordinate input device according to the present invention.
Figure 9:
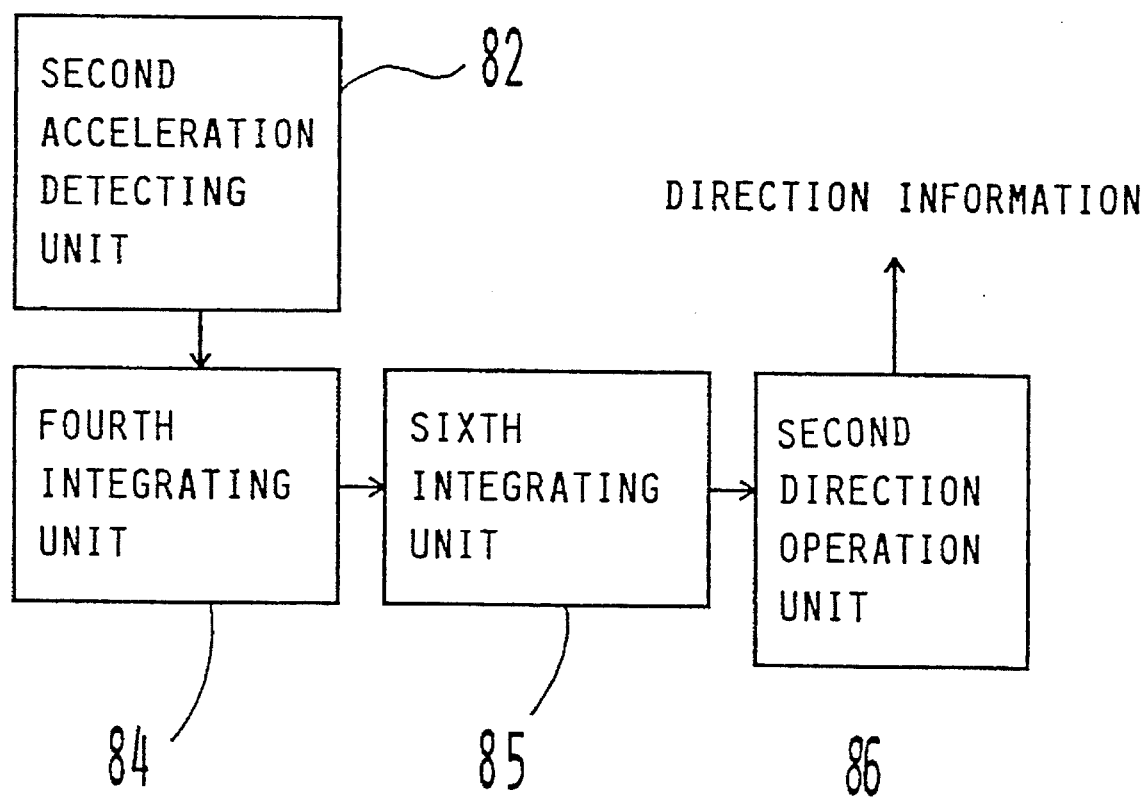
FIG. 9 is a block diagram showing another embodiment of a direction detecting unit of the coordinate input device according to the present invention.

Referring to FIG. 8, when the directional detecting unit 7 integrates the acceleration output by the second acceleration detecting unit 82 through the fourth integration unit 84, and subtracts the resultant velocity in the subtraction unit 83 to output the angular velocity to the first direction operation unit 7, the directional information obtained by the first directional operation unit 75 is the same as described above. Furthermore, as shown in FIG. 9, the incline direction detecting unit 7 may detect three dimensional acceleration at three points within a pen which are not on the same straight line in the second acceleration detecting unit 82; integrate the three dimensional acceleration at three points within the pen outputted from the second acceleration unit 82 by the fourth integration unit 84 and the sixth integration unit 85; obtain the coordinates at various points within the pen; and determine the incline and direction of the pen using the difference between three coordinates within the pen outputted from the sixth integration unit 85 by the second direction operation unit 86. The direction detection unit 7 should not be limited to the above embodiments, but any kinds of pen incline and directional detecting means, for example, including a gyroscope can be used.

(4) Coordinate Operation Unit

Returning to FIG. 1, the first coordinate transformation unit 4 converts the acceleration detected at the origin of a pen output by the first acceleration detecting unit 1, from the values apX, apY, apZ in the pen coordinate system to the values agX, agY, agZ in the static coordinate system. This conversion is performed by substituting the directional information Aij output by the direction detecting unit 7 using the equation (4). However, any known method for converting from a value in the pen coordinate system to a value in the static coordinate system in accordance with the directional information provided by the direction detecting unit 7 can be used. The operation performed in the first coordinate converting unit 4 may be realized by using analog AND/OR circuits with known operational amplifiers or by using digital circuits and software.

$$\begin{pmatrix} agX \\ agY \\ agZ \end{pmatrix} = \begin{pmatrix} A11 & A12 & A13 \\ A21 & A22 & A23 \\ A31 & A32 & A33 \end{pmatrix} \begin{pmatrix} apX \\ apY \\ apZ \end{pmatrix} \quad \text{Equation (4)}$$

The first gravity compensation unit 2 removes the effect of gravity from the values agX, agY, agZ which is obtained by subtracting the effect gX, gY, gZ of acceleration of gravity assumed in the static coordinate system from the acceleration of the origin of the pen coordinate system in the static coordinate system output from the first coordinate conversion system 4 using the equation (5). The operation performed in the first gravity compensation part 2 can be substituted by any way which can remove the effect of gravity. The first gravity compensation unit 2 also can be realized by a digital circuit or software in addition to an analog circuit or the like.

$$\begin{pmatrix} aX \\ aY \\ aZ \end{pmatrix} = \begin{pmatrix} agX \\ agY \\ agZ \end{pmatrix} - \begin{pmatrix} gX \\ gY \\ gZ \end{pmatrix} \quad \text{Equation (5)}$$

The first integration unit 3 integrates the accelerations aX, aY, aZ in the static coordinate system of the origin in the pen coordinate system outputted from the first gravity compensation part 2 and the velocities VX, VY, VZ to the second integration unit 5 in the static coordinate system. The integration performed in the first integration unit 3 can be realized using analog integration circuit with known operational amplifier. The integration also can be realized using a digital circuit or software which operates the recurrence formula expressed by the equation (6).

$$\begin{matrix} VX(t) = VX(t-\Delta t) + \Delta t\, aX(t) \\ VY(t) = VY(t-\Delta t) + \Delta t\, aY(t) \\ VZ(t) = VZ(t-\Delta t) + \Delta t\, aZ(t) \end{matrix} \quad \text{Equation (6)}$$

where Δt represents an operation period of the recurrence formula.

The second integration part 5 integrates the velocities VX, VY, VZ in the static coordinate system outputted from the first integration system 3 and outputs the information on the origin positions OX, OY, OZ of the pen coordinate system in the static coordinate system to the second coordinate converting unit 6. The integration of the second integration unit 5 may be realized using analog circuit or the like. The integration also may be realized using a digital circuit or software which performs the recurrence formula expressed by the equation (7).

$$OX(t) = OX(t - \Delta t) + \Delta t\, VX(t)$$
$$OY(t) = OY(t - \Delta t) + \Delta t\, VY(t) \qquad \text{Equation (7)}$$
$$OZ(t) = OZ(t - \Delta t) + \Delta t\, VZ(t)$$

where $\Delta t$ represents an operation period of the recurrence formula.

Figure 4:
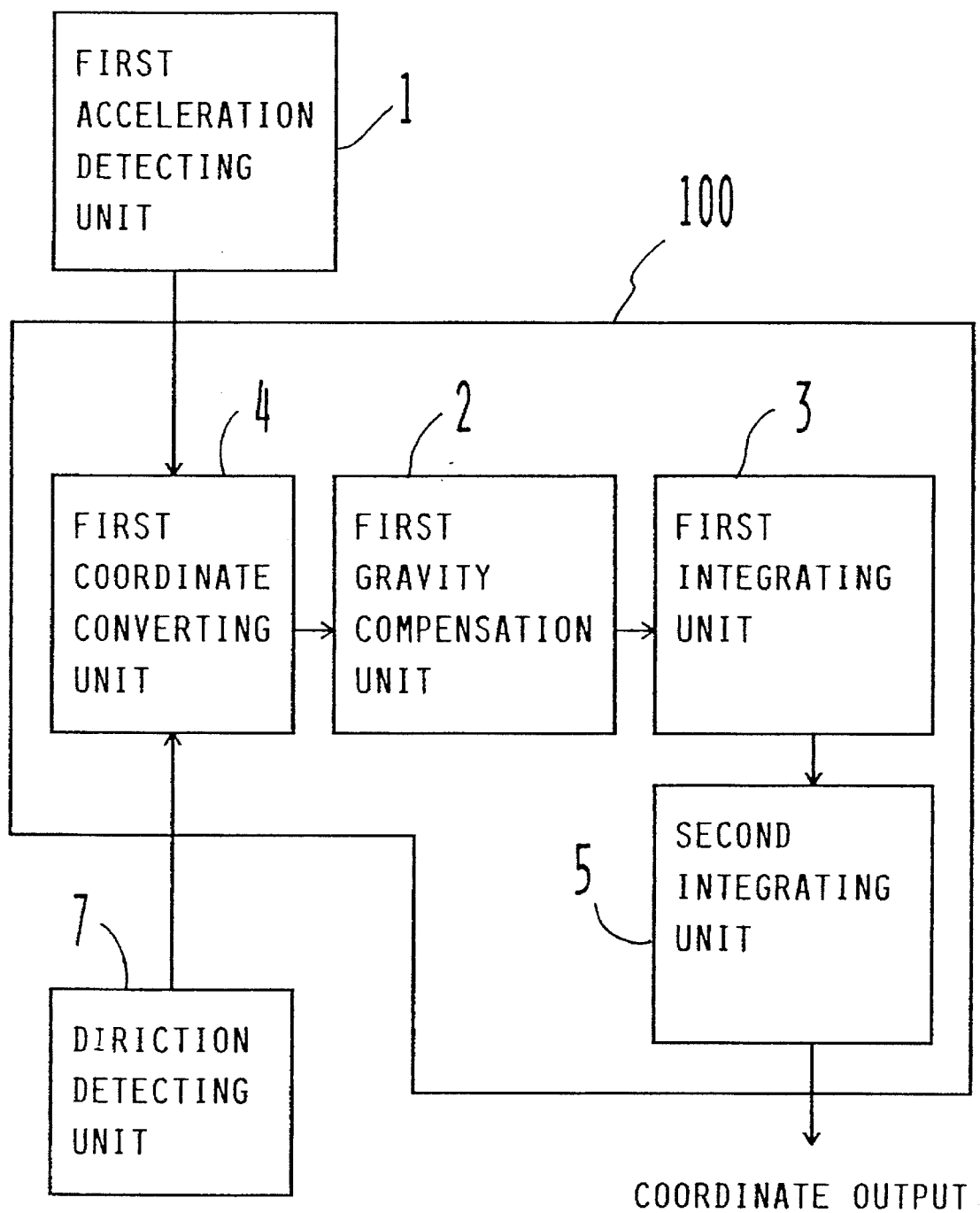
FIG. 4 is a block diagram showing another embodiment of the coordinate input device according to the present invention.

The second coordinate converting unit 6 operates the coordinates X, Y, Z of the pen tip in the static coordinate system by substituting for the equation (8) the positions OX, OY, OZ of the origin 88 in the pen coordinate system in the static coordinate system outputted from the second integration unit 5, the directional information Aij outputted from the directional detecting unit 7, and the positions TX, TY, TZ of the pen tip 89 in the pen coordinate system. The operation of the second coordinate converting unit 6 may be realized using an analog circuit, a digital circuit or the like, or by using software. When the origin of the pen coordinate system is close to the position of the pen tip, the position TX, TY, TZ of the pen tip in the pen coordinate system is nearly zero. Therefore the second coordinate converting unit 6 can be eliminated as shown in FIG. 4.

$$\begin{pmatrix} X \\ Y \\ Z \end{pmatrix} = \begin{pmatrix} A11 & A12 & A13 \\ A21 & A22 & A23 \\ A31 & A32 & A33 \end{pmatrix} \begin{pmatrix} TX \\ TY \\ TZ \end{pmatrix} + \begin{pmatrix} OX \\ OY \\ OZ \end{pmatrix} \quad \text{Equation (8)}$$

According to the present invention, the first integration unit 3, the second integration unit 5, the third integration unit 73, the fourth integration unit 84, the sixth integration unit 85, the first directional operation unit 75, and the second directional operation unit 86 have different outputs in the initial states of an operation, respectively. Therefore in this present invention, it has been assumed that a pen is in parallel with gravity at the origin of the coordinate at which the initial states at various portions are inputted. That is, the operation for coordinate input is started with a pen being in parallel with gravity at the origin. However the initial state should not be limited to the above case and it is possible to initialize by arranging a reset switch for initialization in a specific direction of a specific coordinate. The initial setting may be carried out using a programmable configuration. Any kind of initial setting may be applicable if there is no problem in practice.

(5) Improved Direction Detecting Unit

Figure 13:
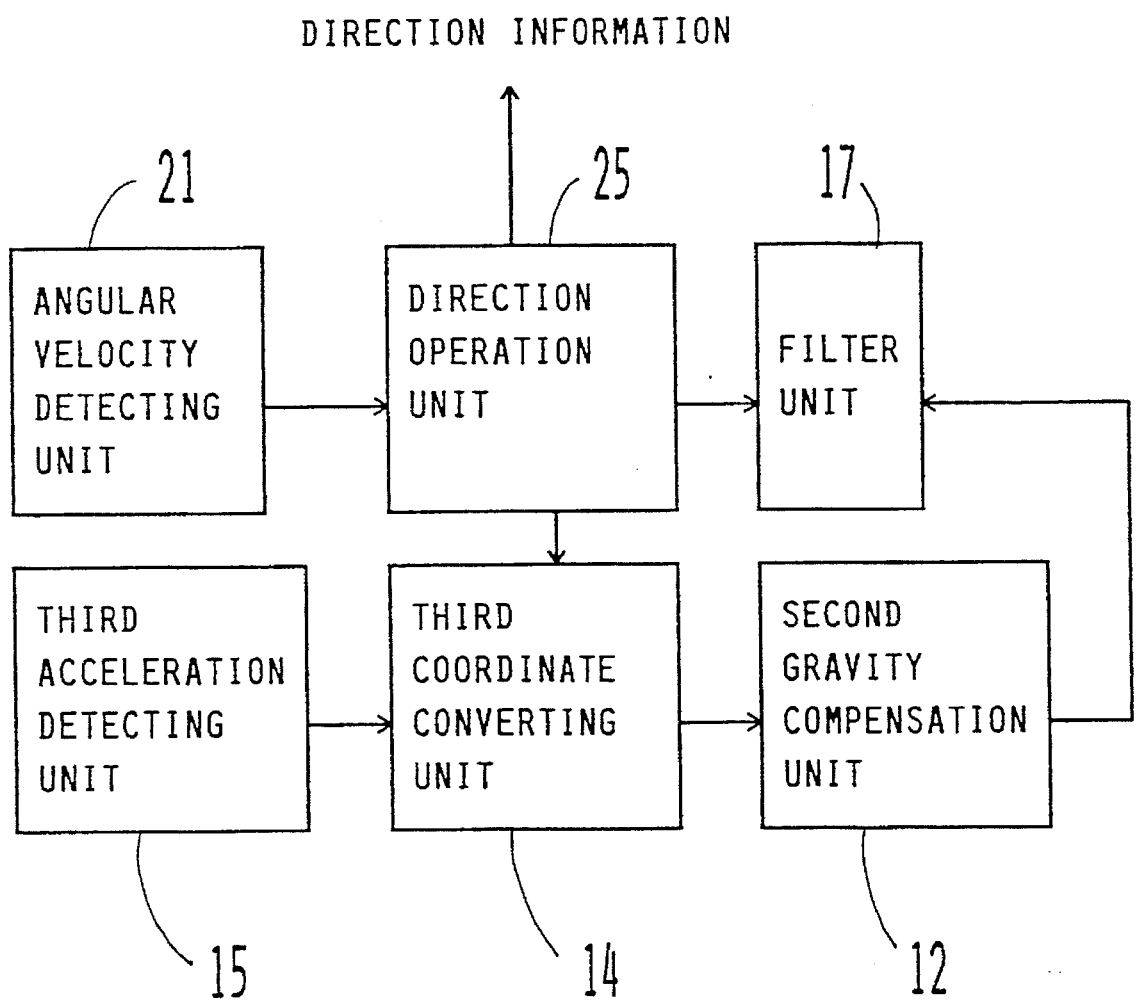
FIG. 13 is a block diagram showing another embodiment of a direction detecting unit of the coordinate input device according to the present invention.

In the direction detecting unit 7 described above, an operational error occurs through an integration operation to obtain a directional information. This problem, as shown in FIG. 13, can be solved by consisting the direction detecting unit 7 of an angular detecting unit 21, a third acceleration detecting unit 15, a third coordinate converting unit 14, a second gravity compensation unit 12, a filter unit 17, and a directional operation unit 25. In this case, the directional detecting unit 7 detects the angular velocity of a pen in the angular velocity detecting unit 21 and then the directional operation unit 25 obtains the direction of the pen from the pen angular velocity. A pen coordinate can be accurately inputted by detecting an acceleration including the effect of gravity to output its output in the third acceleration detecting unit, converting the output from the third acceleration detecting unit 15 into a value in the coordinate system inputted from the pen coordinate system in the third coordinate converting unit 14, based on the pen direction outputted from the directional operation unit 25, removing an assumed effect of gravity in a virtual static coordinate system in the second gravity compensation unit 12 from output including an effect of gravity in the third coordinate transformation unit 14, further removing the dynamic component from the output of the second gravity compensation unit 12 using the filter unit 17 to obtain a coordinate conversion error of gravity produced in the third coordinate converting unit 14, and compensating the direction of the pen outputted from the direction operation unit 25 so as to reduce the coordinate conversion error of gravity in the third coordinate converting unit 14, whereby error is prevented from being accumulated in the direction where the directional operation unit 25 outputs. The filter unit 17 can secure the stability of the feedback loop for the compensation to the pen direction.

The angular velocity detecting unit 21, as shown in FIG. 3, which is similar to one comprising the angular acceleration detecting unit 71 and the third integration unit 73 shown in FIG. 3 outputs the angular velocity of a pen.

The third acceleration detecting unit 15 is formed of acceleration detecting units arranged so as to accumulate each of detection directions on the three coordinate axes of a pen coordinate system. This arrangement detects three dimensional accelerations apX, apY, apZ of the origin of the pen coordinate system and outputs them to the third coordinate converting unit 14. The detected values include the effect of gravity. The third coordinate converting unit 14 should not be limited to the present embodiment but can be substituted by any means which detects the three dimensional accelerations of the origin of the pen coordinate system.

The three coordinate converting unit 14 converts the acceleration of a pen including gravity outputted from the third acceleration detecting unit 15 from the values apX, apY, apZ in the pen coordinate system to the values agX, agY, agZ in the static coordinate system. In case where there is an error due to an operation error in the output of the directional operation unit 25, errors EX, EY, EZ may occur in the gravity component coordinate transformation in the third coordinate transformation unit 25. Since the dynamic component error is removed by the filter unit 17, the detailed explanation is omitted for convenience. This transformation is performed by the directional information Aij outputted from the directional operation unit 25 by the equation (9). However, any method which converts an directional information outputted from the directional operation unit 25 from a value in the pen coordinate system to a value in the static coordinate system can be utilized for the conversion. The operation of the third coordinate converting unit 14 can be realized using analog AND/OR circuits including known operational amplifiers as well as by using digital circuits and software.

$$\begin{pmatrix} agX \\ agY \\ agZ \end{pmatrix} + \begin{pmatrix} EX \\ EY \\ EZ \end{pmatrix} = \begin{pmatrix} A11 & A12 & A13 \\ A21 & A22 & A23 \\ A31 & A32 & A33 \end{pmatrix} \begin{pmatrix} apX \\ apY \\ apZ \end{pmatrix} \quad \text{Equation (9)}$$

The second gravity compensation unit 12 compensates the gravity by subtracting the virtual gravity accelerations gX, gY, gZ in the static coordinate system from the output from the third coordinate converting system in accordance with the equation (10), and outputs to the filter unit 17. The coordinate transformation errors EX, EY, EZ of a gravity component produced in the third coordinate converting unit 14 are outputted without compensating in the second gravity compensation unit 12. The operation in the second gravity compensation unit 12 can be realized using analog circuits as well as digital circuits or software.

$$\begin{pmatrix} aX \\ aY \\ aZ \end{pmatrix} + \begin{pmatrix} EX \\ EY \\ EZ \end{pmatrix} = \begin{pmatrix} agX \\ agY \\ agZ \end{pmatrix} + \begin{pmatrix} EX \\ EY \\ EZ \end{pmatrix} - \begin{pmatrix} gX \\ gY \\ gZ \end{pmatrix}$$

Equation (10)

The filter unit 17 removes dynamic components aX, aY, and aZ from the output of the second gravity compensation unit 12 to obtain the coordinate transformation errors EX, EY, EZ of a gravity produced in the third coordinate converting unit 14 due to an error in the output of the directional operation unit 25. The operation of the filter unit 17 is realized by using a known low pass filter. However the filter unit 17 should not be limited to the embodiment, and may be realized using integration circuits as well as analog circuits and software. The filter unit 17 can secure the stability of the feedback loop.

The direction operation unit 25 obtains the direction of a pen using three dimensional angular velocities WX, WY, WZ outputted from the known angular velocity detecting unit 21 while it compensates so as to decrease the coordinate transformation errors EX, EY, EZ of gravity produced in the third coordinate converting unit 14 outputted from the filter unit 17. In this case, the 3×3 matrix coefficient Aij which is the coordinate transformation of a three dimensional rotation defined by the equation (11) is used in order to obtain the direction of a pen. Here PX, PY, PZ are values in the coordinate system viewed from a pen and SX, SY, SZ are values in the static coordinate system being a base for input of coordinates. However, by utilizing that the directional information of a pen is independent of the pen position, it is assumed that the origin of the pen coordinate system coincides with that of the static coordinate for convenience of the operation.

Any information which represents the direction of a pen can be used. For example, The pen direction is represented by two directional components of a certain direction in both a polar coordinate system of a pen and an angle of the pen rotated on the certain direction, or by both a three dimensional direction including a vector in the static coordinate system showing a certain direction of a pen and an angle of the pen rotated on the certain direction thereof.

$$\begin{pmatrix} SX \\ SY \\ SZ \end{pmatrix} = \begin{pmatrix} A11 & A12 & A13 \\ A21 & A22 & A23 \\ A31 & A32 & A33 \end{pmatrix} \begin{pmatrix} PX \\ PY \\ PZ \end{pmatrix}$$

Equation (11)

The operation of the direction operation unit 25 can be realized using analog circuits. In addition, the operation can be realized by realizing a recurrence formula such as the equation (12) using digital circuits or software.

$$Aij(t) = Hij(t) \cdot Aij(t-\Delta t) \cdot Wij(t)$$

Equation (12)

where Wij is a matrix showing that direction is changed in accordance with the angular velocity output from the angular velocity detecting unit 21 and can be obtained with the operation by the equation (13).

$$\left. \begin{array}{l} W11(t) = W22(t) = W33(t) = 1 \\ W23(t) = -W32(t) = \Delta t \cdot WX(t) \\ W31(t) = -W13(t) = \Delta t \cdot WY(t) \\ W12(t) = -W21(t) = \Delta t \cdot WZ(t) \end{array} \right\}$$

Equation (13)

Hij is a matrix which corrects the output of the directional operation unit 25 so as to minimize errors EX, EY, EZ in coordinate transformation of gravity in the third coordinate transformation unit 14. Hij is obtained by operating the equation (14) using the errors EX, Ey, EZ output from the filter unit 17 and the virtual gravity accelerations gX, gY, gZ in the static coordinate system in the second gravity compensation unit 12.

$$Hij = Dij \text{(reverse matrix of } Sij\text{)}$$

Equation (14)

Dij represents a gravity component of the output of the third coordinate transformation system 14 after the output of the direction operation unit 25 is corrected and Sij represents a gravity component including an error of the output from the third coordinate transformation unit 14 before the output of the direction operation unit 25 is corrected. Therefore the first column components (D11, D21, D31) of Dij are the acceleration (gX, gY, gZ) due to the effect of gravity assumed in the static coordinate system. The first column components (S11, S21, S31) of Sij are the gravity acceleration before the second gravity compensation unit is compensated and are obtained by adding a gravity coordinate conversion error (EX, EY, EZ) multiplied by a fixed number and a gravity acceleration (gX, gY, gZ) assumed in the second gravity compensation unit. Multiplying the gravity acceleration transformation error (EX, EY, EZ) by a fixed number is carried out to adjust the gain of the feedback loop gain. The second column components (D12, D22, D32) of Dij is the same as the second column components of Sij, and is an arbitrary vector perpendicular to both a compensated error (EX, EY, EZ) outputted from the filter unit 17 and operated using a known method, and the gravity acceleration (gX, gY, gZ) assumed in the second gravity compensation unit. The third column components (D13, D23, D33) of Dij are the same as the third column components (D13, D23, D33) and are obtained by multiplying the second column components (D12, D22, D32) of Dij by −1.

Figure 15:
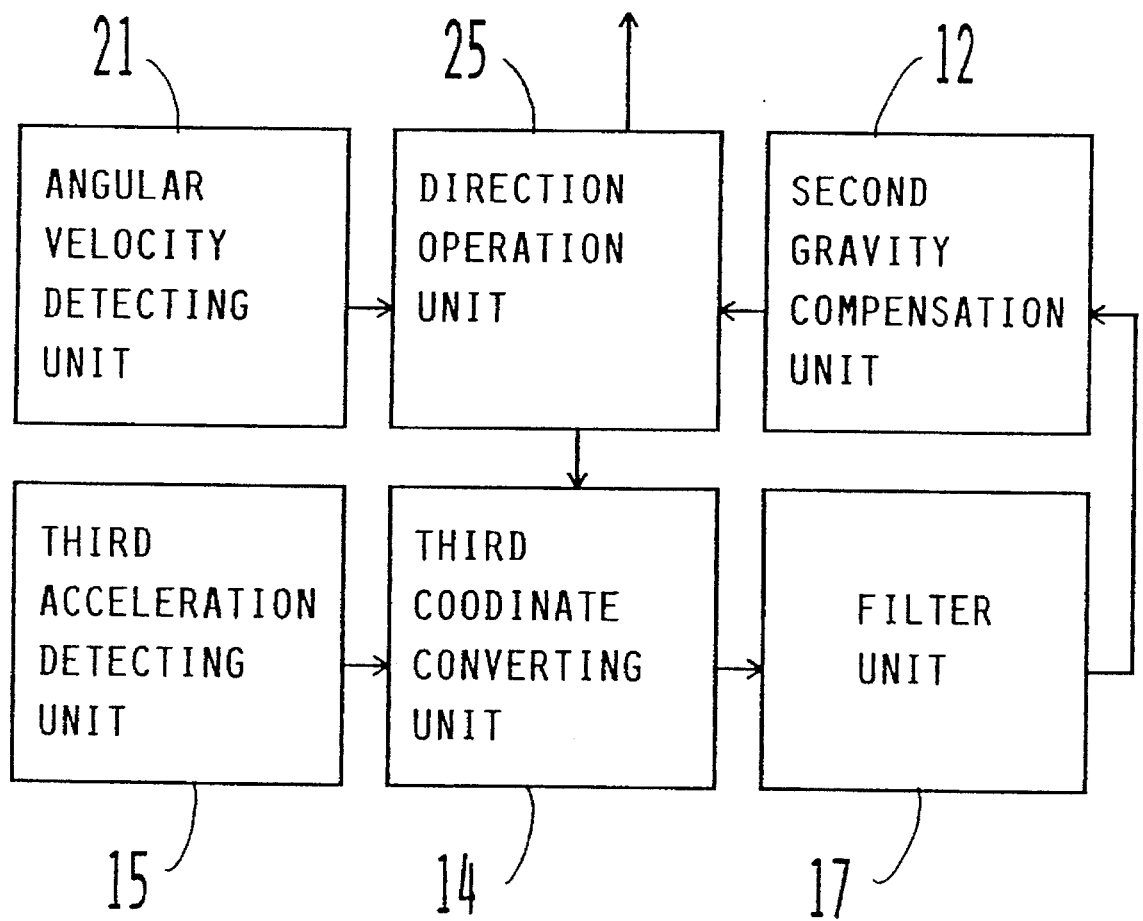
FIG. 15 is a block diagram showing another embodiment of a direction detecting unit of the coordinate input device according to the present invention.

In the above embodiment, the filter unit 17 is arranged between the second gravity conversion unit and the direction operation unit 25. However, the filter part 17, as shown in FIGS. 15 and 16, may be arranged between the third coordinate converting unit 14 and the second gravity compensation unit 12 or between the third acceleration detecting unit 15 and the third coordinate converting unit 14.

Figure 14:
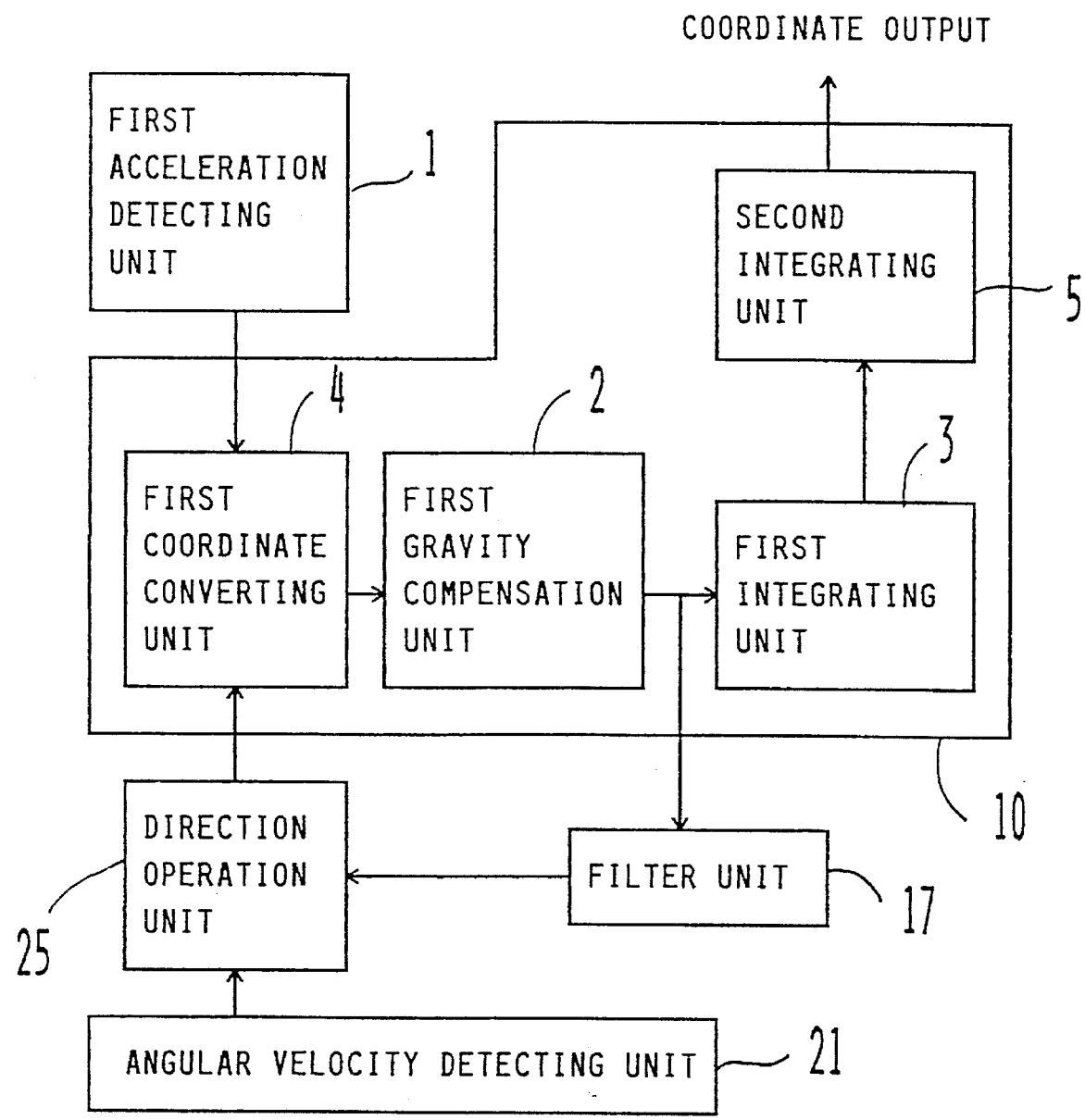
FIG. 14 is a block diagram showing another embodiment of the coordinate input device according to the present invention.

Furthermore, as shown in FIG. 14, the third acceleration conversion unit 15 may be used as the first acceleration detecting unit 4, if necessary. Similarly, the third coordinate converting unit 14 may be used as the first coordinate converting unit 4 while the second gravity compensation unit 12 may be used as the first gravity compensation unit 2.

Figure 16:
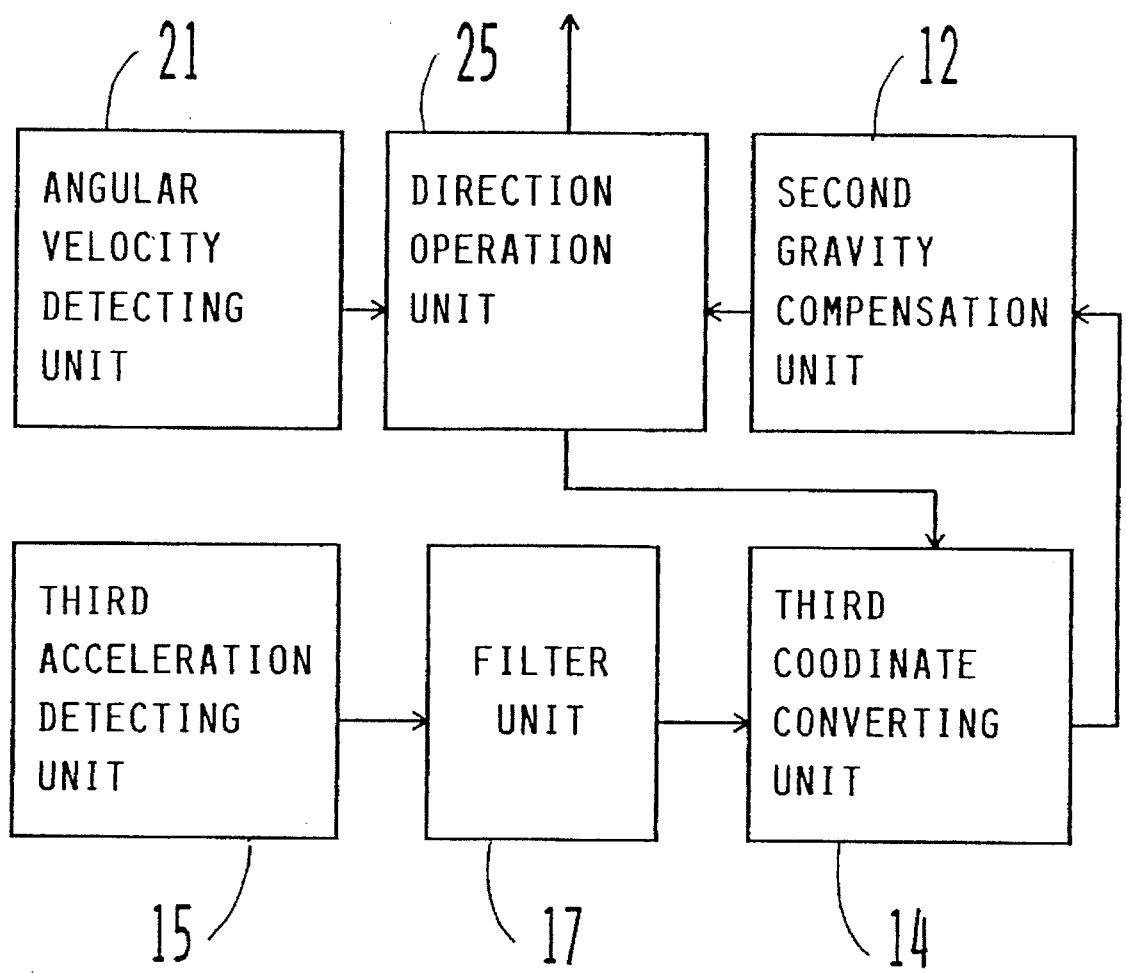
FIG. 16 is a block digram showing another embodiment of a direction detecting unit of the coordinate input device according to the present invention.

As shown in FIG. 16, the third coordinate converting unit 14 may be arranged between the second gravity compensation unit 12 and the filter unit 17. In this case, since the compensation in the second gravity compensation unit 12 is carried out in the pen coordinate system, it is needed to convert the gravity vector used in the second gravity compensation unit 12 from the vector in the static coordinate system to that in the pen coordinate system.

(6) Other Embodiment

Figure 5:
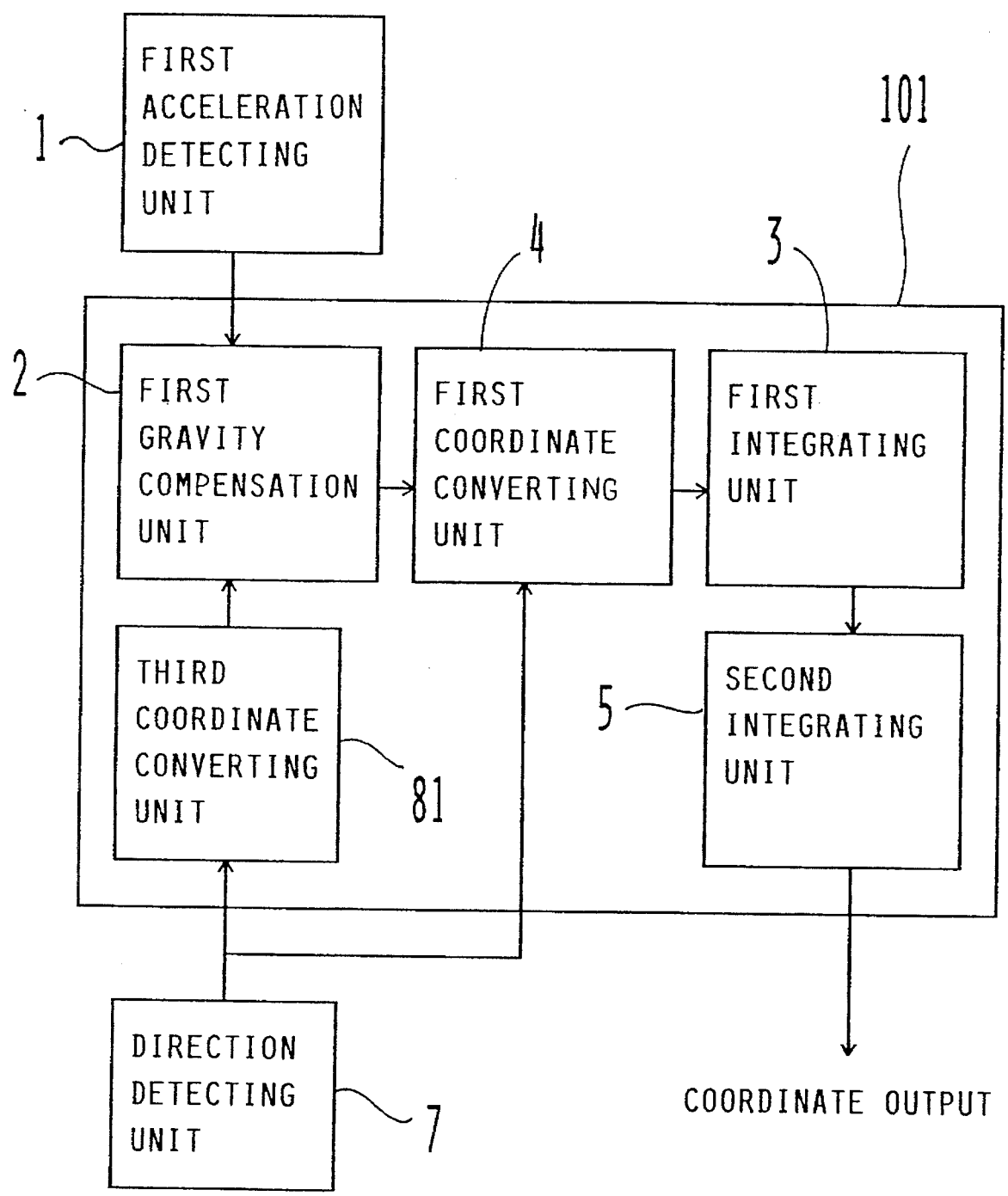
FIG. 5 is a block diagram showing another embodiment of the coordinate input device according to the present invention.
Figure 6:
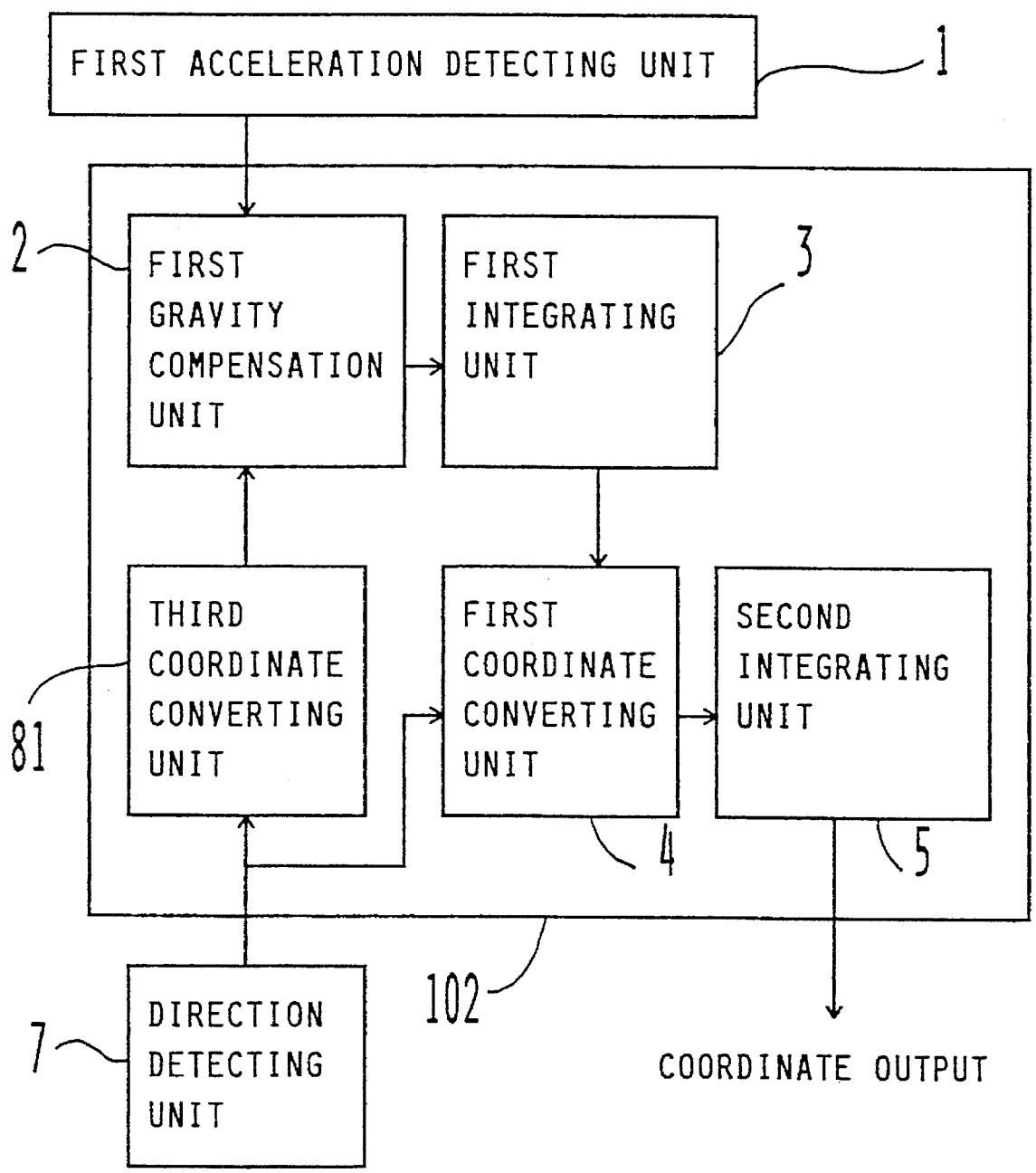
FIG. 6 is a block diagram showing another embodiment of the coordinate input device according to the present invention.

A coordinate input device where the first coordinate converting unit 4 within the coordinate operation unit 10 is arranged between the first acceleration detecting unit 1 and the first gravity compensation unit 2 has been exemplified. However as shown in FIG. 5, the first coordinate converting unit 4 may be arranged between the first gravity compensation 2 and the first integration unit 3. In this case, since the compensation in the first gravity compensation unit 2 is performed in the pen coordinate system, it is necessary to convert the vector showing the effect of gravity in the third coordinate conversion unit 81 from the vector in the static coordinate system to the vector in the pen coordinate system. Furthermore, as shown in FIG. 6, the first coordinate converting unit 4 may be arranged between the first integration unit 3 and the second integration unit 5. In this case, values in the pen coordinate system extends to the velocity outputted from the first integration unit 3 while values in the static coordinate system takes from the second integration unit 5. It has been exemplified that the outputs of the angular acceleration detecting unit 71, the first acceleration detecting unit 1, the second acceleration detecting unit 82, and the third acceleration detecting unit 15 take values in the rectangular coordinate system. When some reasons including the shape of a pen allow that the output takes a value in other coordinate systems such as oblique coordinate, cylindrical coordinate, polar coordinate which can specify a value in a three dimensional space or takes a value in a coordinate system with different magnification, a coordinate transformation may be carried out by a known method if necessary. It has been exemplified that a rectangular coordinate is used for the pen coordinate system and the static coordinate system. However if acceleration, velocity, position, direction or the like in three dimensional space can be specified, it is possible to use any coordinate system without limiting. Furthermore the line which extends in the detection direction of the acceleration detector 11 passes through the origin has been represented. However when the extending line in detection direction of the acceleration detector 11 is away from the origin, the acceleration of the origin can be easily obtained accurately by removing the angular acceleration component obtained from the output of the angular acceleration detector from the output of the acceleration detector 11.

Figure 10:
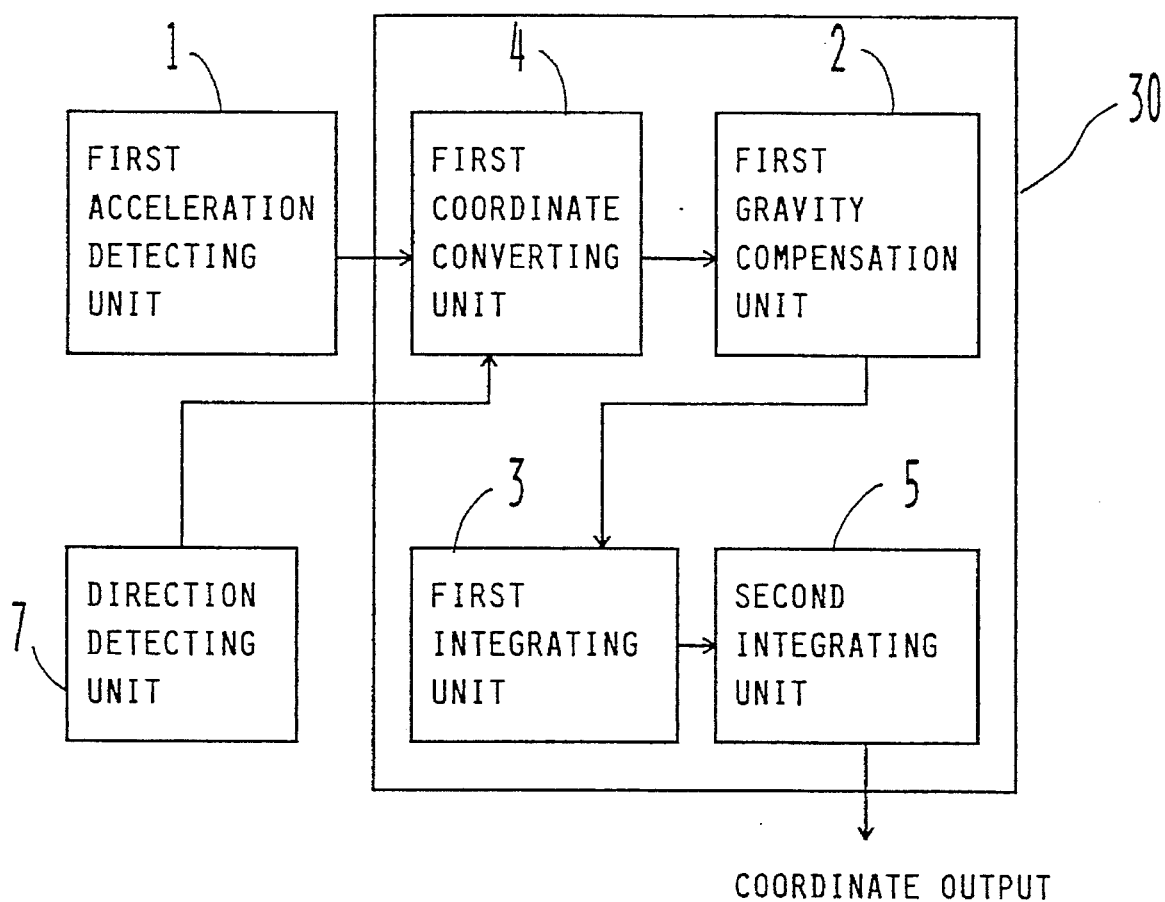
FIG. 10(a) is a block diagram of another embodiment of the coordinate input device present invention.
FIG. 10(b) is a block diagram of a contact detecting unit according to the present invention.
Figure 10:
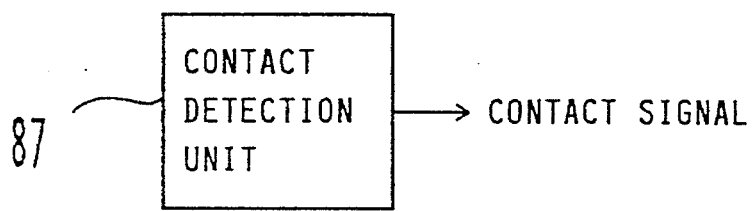

Furthermore, as shown in FIG. 10, in the coordinate input device according to the present invention, the contact detecting part 87 may be arranged at the pen tip so as to input the position of a pen and the contact condition the tip thereof. Instead of contact condition of the pen tip, it is possible to improve the operability by input information using switches by an operator.

Furthermore, when a pen has a shape which prevents it from rotating in the longitudinal direction, the angular acceleration detector which has an angular acceleration detection axis in the longitudinal direction can be omitted. As described above, a structural reason provides some limits to the operation of the pen, the corresponding acceleration detector or angular acceleration detector can be omitted.

According to the present embodiments, an explanation were made to every block constituting this invention. However, the whole or part of the blocks constituting this invention can be realized using a common processor and circuits.

(7) Embodiment Using Feedback

Figure 17:
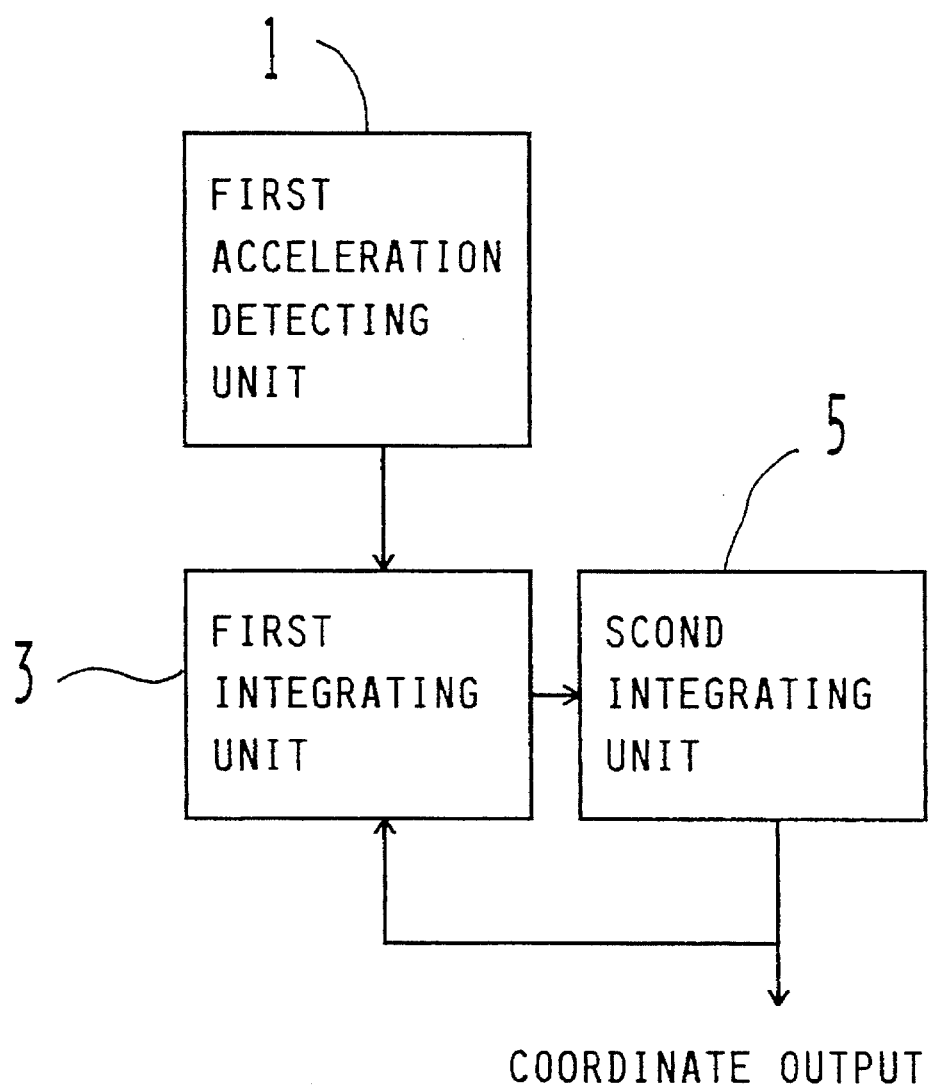
FIG. 17 is a system block diagram showing an embodiment of a feedback structure for the coordinate input device according to the present invention.
Figure 22:
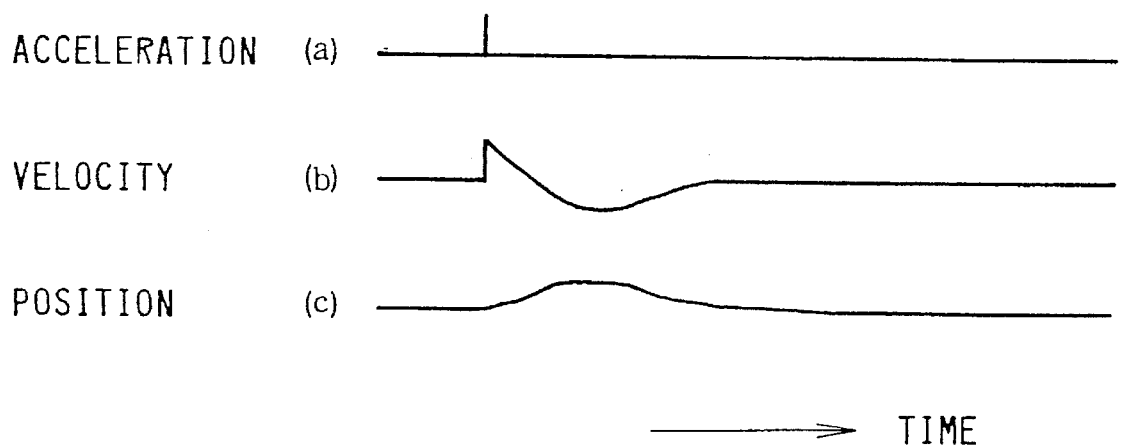
FIG. 22 illustrates a set of waveform diagrams showing the noise response of an embodiment of the feedback structure for the coordinate input device according to the present invention.

As shown in FIG. 17, the coordinate input device according to the present invention detects a pen acceleration by the first acceleration detecting unit 1 and integrates the acceleration detected by the first acceleration detecting unit 1 in the first integration unit 3 to convert to the velocity information and further integrates the velocity information in the second integration unit 5 to convert to a positional information. As shown in FIG. 22, even if a noise is accumulated on acceleration value detected by the first acceleration detecting unit 1, both the velocity information outputted from the first integration unit 3 and the positional information outputted from the second integration detecting unit 5 may be varied temporarily but are not diverged. In the coordinate input device according to the present invention, even when a noise accumulates to an acceleration value of a pen detected by the first acceleration detecting unit 1, the feedback loop arranged for integration operation the detected value can prevent the divergence of detected value. The negative feedback of a positional information may cause adversely an error in the operation. However, since the coordinate input device is used usually in a fixed area, a large problem does not cause practically even if a negative feedback is carried out not so as to diverge positional information.

Now detailed explanation will be made as for various portions.

First, the first acceleration detecting unit 1 which is similar to one which has been already described detects three-dimensional accelerations of a pen. However, the dimensional number should not be limited to three dimension and other dimensions may be used under limited conditions. If necessary, the output of the first acceleration detecting unit 1 may be subjected to a coordinate transformation to gravity compensation and pen direction according to the present invention.

Figure 18:
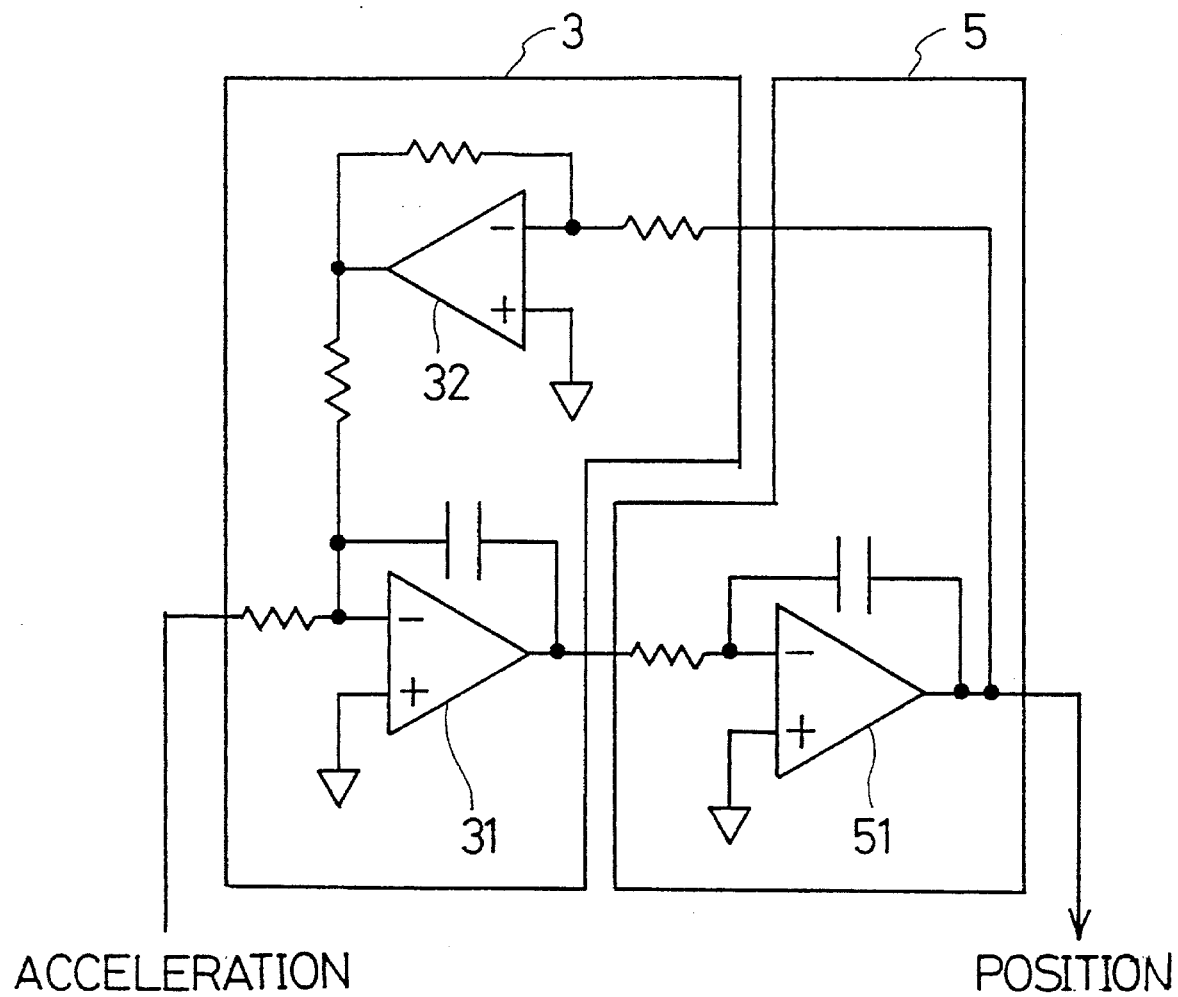
FIG. 18 is a circuit diagram for an embodiment of the first integrating unit and a second integrating unit in a feedback structure for the coordinate input device according to the present invention.

In the first integration unit 3, as shown in FIG. 18, the positional data output by the operational amplifier 51 consisting of the second integration unit 5 is inverted by the operational amplifier 32. The inverted data is added with the acceleration data of a pen output by the first acceleration detecting unit 1 and then the resultant is integrated. The resultant velocity data is output from the second integration unit 5. The velocity has a negative value for convenience of a circuit but should not be limited. Here even when a noise accumulates to the acceleration data, since a negative feedback is provided in such a manner that the positional data outputted from the second integration unit 5 does not diverge, the velocity data varies temporarily but returns initially after a lapse of sufficient long time, as shown in FIG. 22. As described above, as the first integration unit 3 may be used any type of units which integrates an acceleration data output from the first acceleration detecting unit 1 by providing a negative feedback using the positional data output from the second integration unit 5. The integration by the first integration unit 3 has been realized as an example, using an analog integration circuit or the like including operational amplifier 31 but it can be realized through an operational digital circuit as well as software.

The second integration unit 5, as shown in FIG. 18, an operational amplifier 51 integrates the velocity data of a pen outputted from the first integration unit 3 to obtain positional data. For that reason, even if a noise accumulates to an acceleration data, since a negative feedback is provided in such a manner that a positional data outputted from the second integration unit 5 does not diverge, the positional data, as shown in FIG. 22, may vary temporarily but returns to the origin after a lapse of sufficient long time. Any one can be used which integrates velocity data outputted from the first integration unit 3 and operates a positional data to output to the first integration unit 3. It has been exemplified that the integration by the second integration unit 5 is realized by an analog integration circuit or the like using the operational amplifier 51, but it may be realized by a digital circuit or software.

Figure 19:
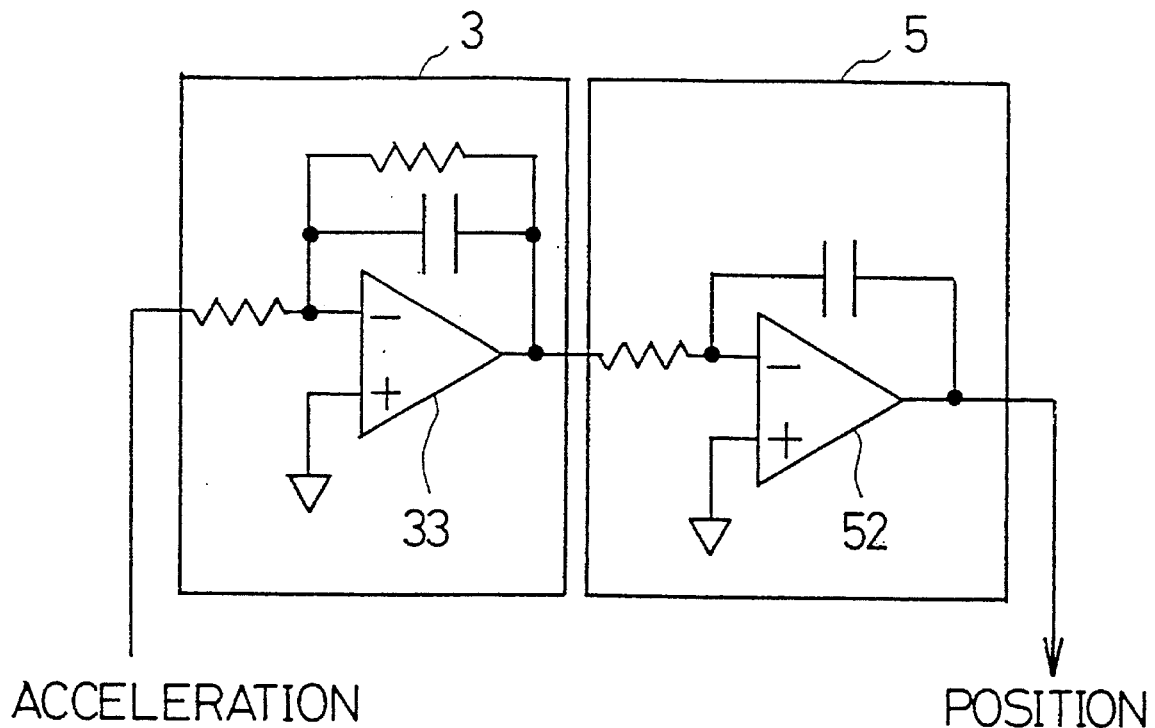
FIG. 19 is a circuit diagram of a first integrating unit and a second integrating unit in another embodiment of the feedback structure of the coordinate input device according to the present invention.
Figure 23:
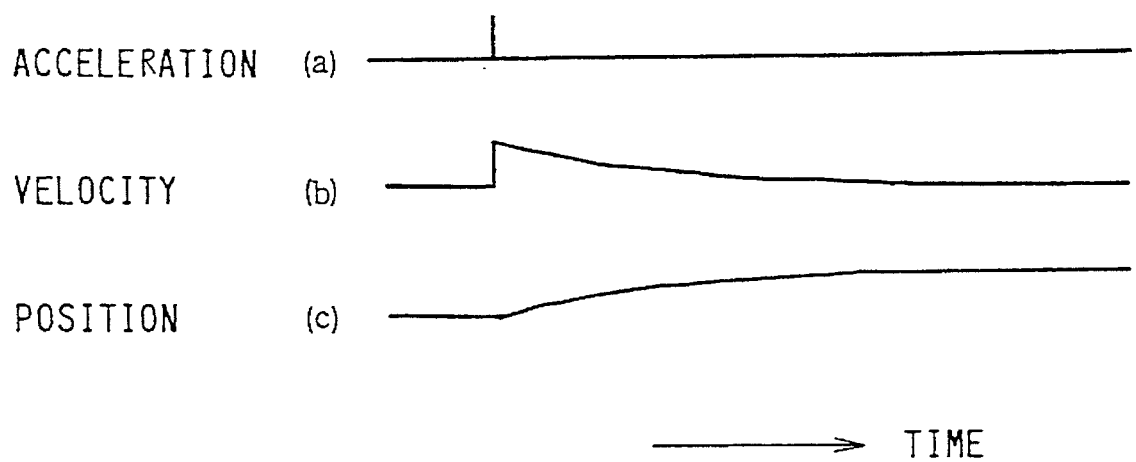
FIG. 23 illustrates a set of waveform diagrams showing the noise response operation in another embodiment of the feedback structure of the coordinate input device according to the present invention.

In the similar manner, as shown in FIGS. 19 and 23, even when a noise is accumulated to acceleration, it is possible not to diverge the positional data by performing negative feedback to a velocity data outputted from the operational amplifier 33 consisting of the first integrate unit 3 to the input of the operational amplifier 33 in the first integration unit 3. In this case, an error is added to the positional data.

Figure 20:
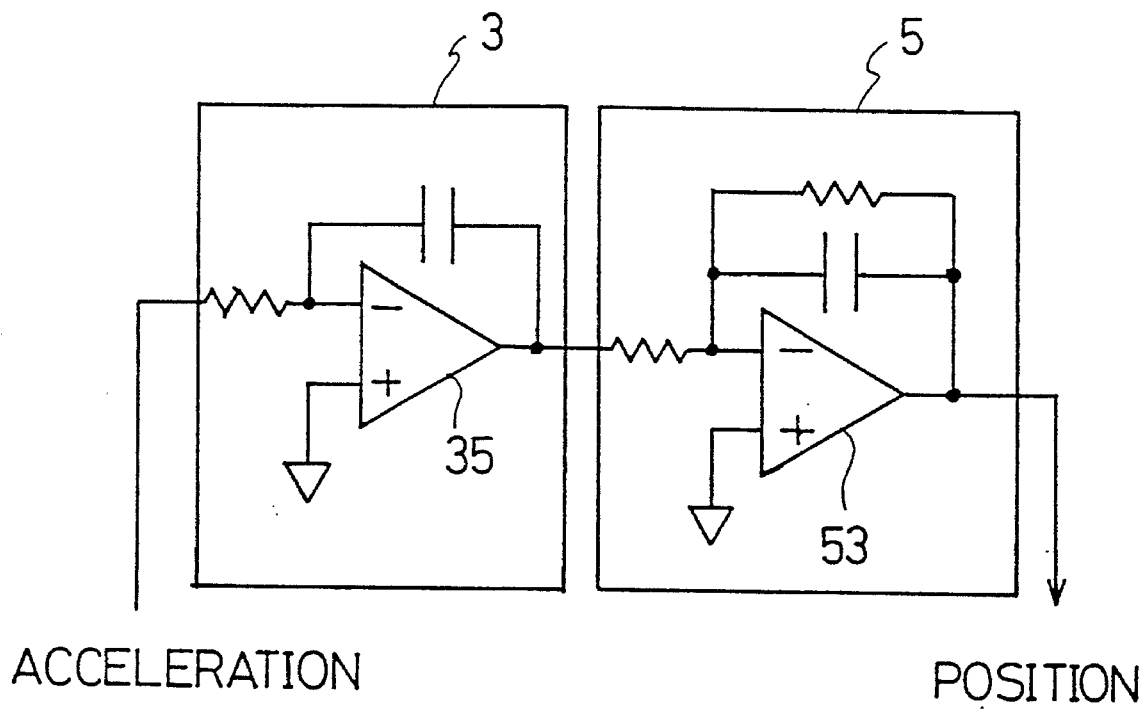
FIG. 20 is a circuit diagram for a first integrating unit and a second integrating unit in another embodiment of the feedback structure for the coordinate input device according to the present invention.
Figure 21:
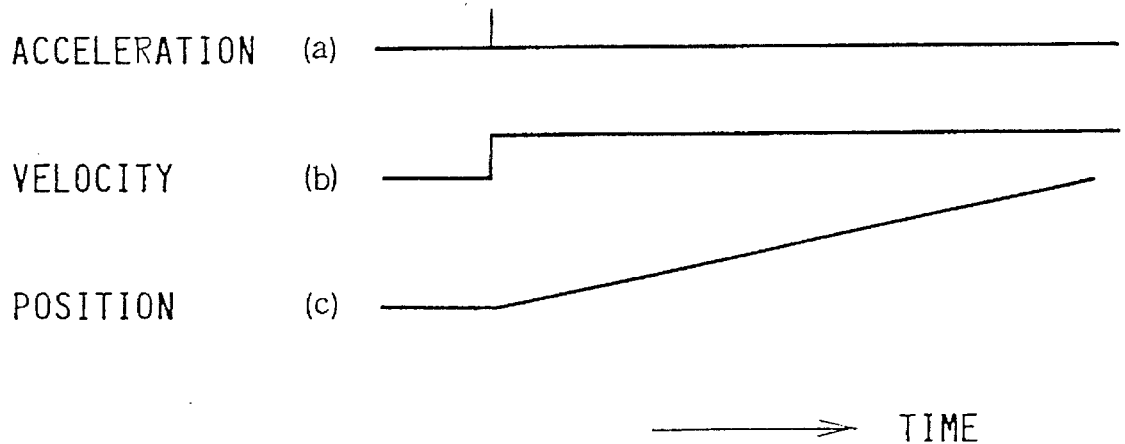
FIG. 21 illustrates a set of waveform diagrams showing the noise response of a conventional coordinate input device.
Figure 24:
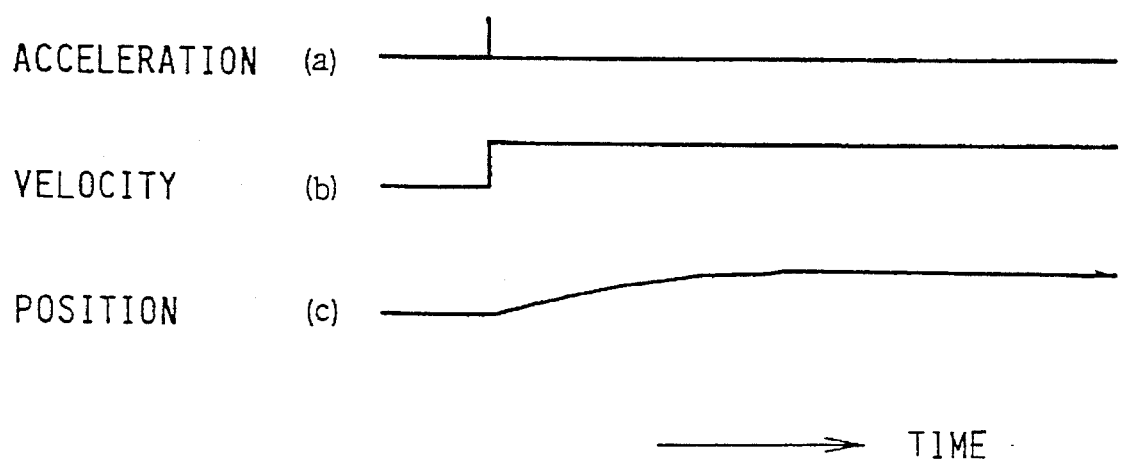
FIG. 24 illustrates a set of waveform diagrams showing the noise response operation in another embodiment of the feedback structure for the coordinate input device according to the present invention.

As shown in FIGS. 20 and 24, even if the velocity data is changed due to an accumulation of noise to acceleration, the positional data can be prevented from divergence by providing a negative feedback of the positional data outputted from the operational amplifier 53 consisting the second integration unit 5 to the input of the operational amplifier 53 in the second integration unit 5. In this case, an error is added to the positional data.

Here, as the above mentioned embodiment has been shown any one of the configuration which provides a feedback from the output of the second integration unit 5 to the input of the first integration unit 3, the configuration which provides a feedback from the output of the first integration unit 3 to the input of the first integration unit 3, or the configuration which provides a feedback from the output of the second integration unit 5 to the input of the second integration unit 5. However it may be possible to combine the plural configurations together.

The present embodiment has been explained regarding each of the blocks consisting the present invention. However, whole or part of the blocks of the present invention can be realized using a common processor and circuits.

In various embodiments explained above, a pen has been used as the coordinate indicator. The shape thereof should not be limited to the pen type, but can be applied to indicators with various shapes.

Furthermore, in the present embodiment, the three dimensional input device has been described, but it is easy to apply the present invention to two-dimensional coordinate input devices.

As described above, the coordinate input device according to the present invention comprises an acceleration detecting means, a directional detection means, a first coordinate converting means, a second coordinate converting means, a gravity compensation means, a first integration means, and a second integration means. This configuration can obtain effectively an accurate coordinate which is removed accurately the effect of gravity by compensating gravity according to the direction of a pen even when it tilts. Even if an acceleration detector is separated away from the pen tip, since the position thereof can be operated accurately in accordance with the direction of a pen, the accurate coordinate of the pen tip can be obtained effectively. Furthermore the coordinate input device according to the present invention can input effectively three dimensional coordinate by detecting three dimensional acceleration and angular acceleration.

Furthermore, in the coordinate input device according to the present invention, when the angular acceleration detecting unit 71 is combined with the acceleration detector, the total weight and cost thereof can be decreased effectively by using the acceleration detector for acceleration detection as an angular acceleration detector for acceleration detection.

Furthermore, the coordinate input device includes a direction detecting unit comprising a third acceleration detecting means, a third coordinate transformation means, a second gravity compensation means, an angular detecting means, an directional operation means, and a filter means. Therefore, since an error is not accumulated in the direction detection by the coordinate indicator, a stable, accurate coordinate from which the effect of gravity is accurately removed can be obtained.

Furthermore, the coordinate input device according to the present invention comprises an acceleration means for detecting the acceleration of a pen, a first integration means for integrating the output of the acceleration detecting means, and a second integration means for integrating the output from the first integration means to provide a feedback to the first integration means. The coordinate input device according to the present invention can prevent the divergence of the detected value by arranging a feedback loop to integrated operation when noise is added to the detected value of the acceleration of a pen. Therefore can obtain a coordinate input device where an periodical initialization to the integration unit needed in a conventional one is neglected.

What is claimed is:

1. A coordinate input device for obtaining the spatial coordinates at the tip of a pen-type coordinate indicator, comprising: acceleration detecting means for detecting the acceleration of a body of the pen-type coordinate indicator; attitude detecting means for detecting the attitude of the body of the pen-type coordinate indicator; and coordinate operation means for determining the spatial coordinates at the tip of the coordinate indicator in accordance with outputs of the acceleration detecting means and the attitude detecting means.

2. A coordinate input device according to claim 1; wherein the coordinate operation means comprises first coordinate converting means for performing coordinate transformation on an input signal using an output signal of the attitude detecting means, gravity compensation means for removing the effect of gravity with respect to the input signal, and first integrating means for integrating the input signal to convert it into the spatial coordinates at the tip of the coordinate indicator.

3. A coordinate input device according to claim 1; wherein the attitude detecting means comprises angular acceleration detecting means for detecting an angular acceleration of the coordinate indicator, second integrating means for converting an angular acceleration signal output by the angular acceleration detecting means into an angular velocity signal or angular information and direction operation means for converting the angular velocity signal or angular information into the attitude of the body of the pen-type coordinate indicator.

4. A coordinate input device according to claim 2; further comprising second coordinate converting means for performing coordinate transformation of the spatial coordinates output by the first integrating means using the output of the attitude detecting means.

5. A coordinate input device according to claim 1; wherein an acceleration detector included in the acceleration detecting means serves as an acceleration detector included in the attitude detecting means.

6. A coordinate input device according to claim 1; wherein the attitude detecting means comprises an angular acceleration detecting means in which at least two sets of acceleration detectors, each set of which comprises a pair of parallel acceleration detectors, are arranged to correspond to the axes in which the coordinate indicator detects an input signal independently in each axis for at least two-directional acceleration, integrating means for receiving an output from the angular acceleration detecting means and outputting velocity signals corresponding respectively to the outputs of the acceleration detectors, subtraction means for subtracting one of the velocity signals from the other corresponding to the outputs of the acceleration detectors to obtain an angular velocity signal, and direction operation means for converting the angular velocity signal into information representative of the attitude of the coordinate indicator.

7. A coordinate input device according to claim 1; wherein the attitude detecting means comprises acceleration detecting means for detecting three-dimensional accelerations at three points within the body of a coordinate indicator, the three points not being on the same straight line, integrating means for obtaining the coordinates at the three points using the output from the acceleration detecting means, and direction operation means for obtaining the difference between the coordinates at the three points to determine the attitude of the coordinate indicator.

8. A coordinate input device according to claim 1; wherein the attitude detecting means comprises angular velocity detecting means for detecting an angular velocity of the coordinate indicator; direction operation means for determining the attitude of the coordinate indicator using the output from the angular velocity detecting means; acceleration detecting means for detecting the acceleration of the coordinate indicator; coordinate converting means for performing coordinate transformation of a detected acceleration of the coordinate indicator or gravity acceleration using the attitude output from the direction operation means; gravity compensation means for removing an effect of gravity from the detected acceleration of the coordinate indicator; and filter means for removing a dynamic component from the detected acceleration of the coordinate indicator.

9. A coordinate input device for inputting the spatial coordinates of a coordinate indicator using an acceleration detector, the coordinate input device comprising: a coordinate indicator for indicating an input coordinate; acceleration detecting means fixed in the coordinate indicator for detecting an acceleration of the coordinate indicator; first integrating means for integrating the acceleration output by the acceleration detecting means and for obtaining a velocity of the coordinate indicator; second integrating means for integrating the velocity output by the first integrating means and for obtaining the position of the coordinate indicator; and negative feedback means for performing a negative feedback function from the output of the second integrating means to the input of the first integrating means.

10. A coordinate input device for inputting the spatial coordinates of a coordinate indicator using an acceleration detector, the coordinate input device comprising: a coordinate indicator for indicating an input coordinate; acceleration detecting means fixed in the coordinate indicator for detecting an acceleration of the coordinate indicator; first integrating means for integrating the acceleration output by the acceleration detecting means and for obtaining a velocity of the coordinate indicator; second integrating means for integrating the velocity output by the first integrating means and for obtaining the position of the coordinate indicator; and at least one of a negative feedback means for performing a negative feedback function from the output of the first integrating means to the input of the first integrating means or a negative feedback means for performing a negative feedback function from the output of the second integrating means to the input of the second integrating means.

11. A coordinate input device for calculating the spatial coordinates at the tip of a pen-type coordinate indicator, the coordinate input device comprising: coordinate detecting means for determining the spatial coordinates of a pen-type coordinate indicator in a first coordinate system; attitude detecting means for determining the attitude of a body of the coordinate indicator; and first coordinate conversion means for determining the spatial coordinates at the tip of the coordinate indicator in a second coordinate system in accordance with the spatial coordinates of the coordinate indicator body in the first coordinate system and the attitude of the coordinate indicator body.

12. A coordinate input device according to claim 11; wherein the coordinate detecting means comprises acceleration detecting means for detecting the acceleration of the coordinate indicator in at least two dimensions and integrating means for integrating and converting the detected acceleration into the spatial coordinates of the coordinate indicator.

13. A coordinate input device according to claim 12; wherein the coordinate detecting means further comprises gravity compensating means for eliminating the effect of acceleration due to gravity from the detected acceleration.

14. A coordinate input device according to claim 11; wherein the first coordinate system is a dynamic system comprising at least two coordinate axes wherein the second coordinate system is a static system comprising at least two axes wherein the origin is a static, predetermined point.

15. A coordinate input device according to claim 11; further comprising second coordinate conversion means for converting the coordinates of the coordinate indicator in the second coordinate system into the coordinates at the tip of the coordinate indicator in the second coordinate system.

16. A coordinate input device according to claim 11; wherein the attitude detecting means comprises angular acceleration detecting means for detecting an angular acceleration of the coordinate indicator, second integrating means for converting the angular acceleration into angular velocity or angular information, and direction operation means for converting the angular velocity or angular information into the attitude of the coordinate indicator.

17. A coordinate input device according to claim 16; wherein the direction operation means includes means for performing coordinate transformation of the spatial coordinates of the coordinate indicator in accordance with a 3×3 matrix $A_{ij}$ coefficient representing three dimensional rotation defined by the following equation:

| SX | | A11 | A12 | A13 | | PX |
|----|---|-----|-----|-----|---|----|
| SY | = | A21 | A22 | A23 | | PY |
| SZ | | A31 | A32 | A33 | | PZ | wherein the matrix coefficients $A_{ij}$, (i=1–3, j=1–3), represent the attitude of the coordinate indicator, PX, PY and PZ represent coordinates in the first coordinate system and SX, SY and SZ represent coordinates in the second coordinate system.

18. A coordinate input device according to claim 17; wherein the direction operation means includes means for calculating $A_{ij}$ at time intervals of delta t, and wherein the relationship between the matrix $A_{ij}$ and the angular velocity or angular information of the coordinate indicator is defined by the following equations:

$$A_{ij}(t) = A_{ij}(t - \text{delta } t) \cdot W_{ij}(t)$$

$$W11(t) = W22(t) = W33(t) = 1$$

$$W23(t) = -W32(t) = \text{delta } t \cdot WX(t)$$

$$W31(t) = -W13(t) = \text{delta } t \cdot WY(t)$$

$$W12(t) = -W21(t) = \text{delta } t \cdot WZ(t)$$

wherein (delta t) represents a calculation period of the device, $A_{ij}(t)$ is a three dimensional matrix representing the attitude of the coordinate indicator, and $W_{ij}(t)$ represents the angular velocity or angular information of the coordinate indicator.

19. A coordinate input device according to claim 11; wherein the attitude detecting means comprises angular velocity detecting means for detecting an angular velocity of the coordinate indicator, direction operation means for determining the attitude of the coordinate indicator using the output from the angular velocity detecting means, acceleration detecting means for detecting the acceleration of the coordinate indicator, coordinate converting means for performing coordinate transformation of a detected acceleration of the coordinate indicator using the output from the direction operation means, gravity compensation means for removing an effect of gravity from the detected acceleration of the coordinate indicator, and filter means for removing a dynamic component from the detected acceleration of the coordinate indicator.

20. A coordinate input device according to claim 11; wherein the coordinate detecting means comprises an acceleration detecting means fixed in the coordinate indicator for detecting an acceleration of the coordinate indicator, first integrating means for integrating the acceleration output by the acceleration detecting means and for determining the velocity of the coordinate indicator, second integrating means for integrating the velocity output by the first integrating means and for determining the position of the coordinate indicator, and negative feedback means for performing negative feedback from the output of the second integrating means to the input of said first integrating means.

21. A coordinate input device according to claim 11; wherein the coordinate detecting means comprises an acceleration detecting means fixed in the coordinate indicator for detecting an acceleration of the coordinate indicator, first integrating means for integrating the acceleration output by the acceleration detecting means and for determining the velocity of the coordinate indicator, second integrating means for integrating the velocity output of the first integrating means and for determining the position of the coordinate indicator, and at least one of a negative feedback means for performing negative feedback from the output of the first integrating means to the input of the first integrating means or a negative feedback means for performing negative feedback from the output of the second integrating means to the input of the second integrating means.

22. A method for calculating the spatial coordinates at the tip of a coordinate indicator, comprising the steps of:

(a) detecting the acceleration at a detecting point of a coordinate indicator in at least two dimensions in a first coordinate system;

(b) determining the attitude of the coordinate indicator;

(c) transforming the acceleration of the detecting point in the first coordinate system to a second coordinate system which is a static coordinate system having a predetermined origin, the transformation being performed in accordance with the attitude of the coordinate indicator:

(d) subtracting the acceleration due to gravity from the transformed detected acceleration value;

(e) integrating the transformed detected acceleration to obtain the spatial coordinates of the detecting point; and (f) determining the spatial coordinates at the tip of the coordinate indicator in accordance with the spatial coordinates at the detecting point and the attitude of the coordinate indicator.

23. A method according to claim 22; wherein the attitude of the coordinate indicator is determined by detecting the angular acceleration of the coordinate indicator, integrating the angular acceleration to convert it into angular velocity or angular information of the coordinate indicator, and determining the attitude of the coordinate indicator using the angular velocity or angular information.

24. A method according to claim 23; wherein the attitude is determined in accordance with the following equation:

$$A_{ij}(t) = A_{ij}(t - \text{delta } t) \cdot W_{ij}(t)$$

$$W11(t) = W22(t) = W33(t) = 1$$

$$W23(t) = -W32(t) = \text{delta } t \cdot WX(t)$$

$$W31(t) = -W13(t) = \text{delta } t \cdot WY(t)$$

$$W12(t) = -W21(t) = \text{delta } t \cdot WZ(t)$$

wherein (delta t) represents a calculation period, $A_{ij}(t)$ is a three-dimensional matrix representing the attitude of the coordinate indicator, and $W_{ij}(t)$ represents the angular velocity or angular information of the coordinate indicator.

25. A method according to claim 22; wherein the attitude of the coordinate indicator is determined by detecting acceleration at three points within the coordinate indicator, said three points not being on the same line, integrating the acceleration values to determine spatial coordinates at each point, and obtaining the difference between the coordinates at the three points to determine the attitude of the coordinate indicator.

26. A coordinate input device for obtaining the spatial coordinates of a pen-type coordinate indicator, comprising: acceleration detecting means for detecting the acceleration of a body of the pen-type coordinate indicator and producing an output; attitude detecting means for detecting the attitude of the body of the pen-type coordinate indicator with respect to a tip thereof and producing an output; and coordinate operation means for determining the spatial coordinates at the tip of the coordinate indicator in accordance with the outputs of the acceleration detecting means and the attitude detecting means such that movement of the body of the coordinate indicator alone is not erroneously detected as movement of the tip.

27. A coordinate input device for calculating the spatial coordinates at the tip of a pen-type coordinate indicator, the coordinate input device comprising: coordinate detecting means for determining the spatial coordinates of a pen-type coordinate indicator in a first coordinate system; attitude detecting means for determining the attitude of a body of the coordinate indicator with respect to a tip thereof; and first coordinate conversion means for determining the spatial coordinates at the tip of the coordinate indicator in a second coordinate system in accordance with the spatial coordinates of the coordinate indicator body in the first coordinate system and the attitude of the coordinate body such that movement of the body of the coordinate indicator alone is not erroneously detected as movement of the tip.

28. A coordinate input device for obtaining the spatial coordinates at the tip of a pen-type coordinate indicator, comprising: acceleration detecting means for detecting the acceleration of a body of the pen-type coordinate indicator and producing an output; attitude detecting means for detecting the attitude of the body of the pen-type coordinate indicator and producing an output; and coordinate operation means for determining the spatial coordinates at the tip of the coordinate indicator in accordance with the outputs of the acceleration detecting means and the attitude detecting means and predetermined data indicating the relationship between the positions of the acceleration detecting means and the tip of the coordinate indicator.

* * * * *